US008108351B2

(12) United States Patent
Mochizuki

(10) Patent No.: US 8,108,351 B2
(45) Date of Patent: Jan. 31, 2012

(54) FILE TIME STAMPING MANAGEMENT APPARATUS, METHOD, AND PROGRAM

(75) Inventor: Takatoshi Mochizuki, Hyogo-ken (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 218 days.

(21) Appl. No.: 11/859,747

(22) Filed: Sep. 22, 2007

(65) Prior Publication Data

US 2008/0263102 A1 Oct. 23, 2008

(30) Foreign Application Priority Data

Nov. 21, 2006 (JP) ................................ 2006-314294

(51) Int. Cl.
*G06F 7/00* (2006.01)
*G06F 17/00* (2006.01)
*G06F 12/00* (2006.01)
*G06F 17/30* (2006.01)

(52) U.S. Cl. ....................................... 707/661; 707/821

(58) Field of Classification Search .................. 707/200, 707/661, 821
See application file for complete search history.

(56) References Cited

U.S. PATENT DOCUMENTS 5,319,562 A * 6/1994 Whitehouse .................. 705/403
5,758,359 A * 5/1998 Saxon ........................... 707/204
5,826,269 A * 10/1998 Hussey ........................... 707/10
6,173,295 B1 * 1/2001 Goertz et al. ................ 715/209
6,188,766 B1 * 2/2001 Kocher ......................... 380/246
6,931,537 B1 * 8/2005 Takura et al. ................ 713/178
2002/0120851 A1 * 8/2002 Clarke .......................... 713/178
2003/0159048 A1 8/2003 Matsumoto et al.
2005/0168775 A1 * 8/2005 Liu ............................. 358/1.15
2005/0289182 A1 * 12/2005 Pandian et al. ............ 707/104.1

FOREIGN PATENT DOCUMENTS

JP 2001-142398 5/2001
JP 2001-319097 11/2001
JP 2002-359619 12/2002
JP 2003-244139 8/2003
JP 2004-248154 9/2004
JP 2004-304338 10/2004
JP 2006-313964 11/2006
JP 2007-148544 6/2007

OTHER PUBLICATIONS

Notification of Reasons for Refusal in JP 2006-314294 dated Sep. 9, 2008, and English Translation thereof.

* cited by examiner

*Primary Examiner* — Charles Lu

(74) *Attorney, Agent, or Firm* — Buchanan Ingersoll & Rooney PC

(57) ABSTRACT

A file management apparatus for managing registered files selects multiple files from the registered files, and integrates date stored in the selected files and stores the integrated date in a single file. Then, the file management apparatus calculates a hash value of the file, obtains a time stamp generated based on the hash value, and adds the time stamp to the file.

21 Claims, 26 Drawing Sheets

SCREEN FOR SETTING TS RESERVATION INFORMATION (FILE)

SCREEN FOR SETTING TS RESERVATION INFORMATION (FOLDER)

FILE TIME STAMPING MANAGEMENT APPARATUS, METHOD, AND PROGRAM

BACKGROUND OF THE INVENTION

1. Field of the Invention

The present invention relates to a file management apparatus for managing electric files, in particular to a technology for managing time stamp addition performed on registered electric files.

2. Description of the Background Art

As electronic documents are increasingly used in many application domains, there are more occasions where evidence of an electronic document is required. For example, as evidence of an electronic document, a digital signature can be used to thereby provide assurance of the creator and authenticity of the document.

However, in order to use electronic documents in business transactions and applications, further evidence is required to prove that such an electronic document existed at a specific point of time. For this purpose, time stamp technology has been employed.

The procedures of time stamp addition and verification are specified in "RFC3161: Internet X.509 Public Key Infrastructure Time-Stamp Protocol (TSP)." Time stamp adding services conventionally provided in compliance with the specification ensure high reliability by adopting a system in which a certificate is obtained from a TA (Time Authority) and a CA (Certification Authority) that are third parties, and a stamp is added by a TSA (Time-Stamping Authority) at a time indicated by the TA.

The use of such time stamp technology allows for proving specifically that the data existed at the date and time when the time stamp was added (evidence of existence) and the data has not been tampered after the addition of the time stamp (evidence of integrity).

Not only for business transactions but also for various electronic documents that individuals and companies store in electronic form, providing strong evidence for these documents will be sought after in line with the enactment of the e-Document Law, the Personal Information Protection Act and the like. As a result, the use of time stamp adding services is expected to dramatically increase.

Conventional services of time stamp addition, however, has been run on a pay-as-you-go basis in which charges are made in proportion to the number of files to which time stamps are added. Accordingly, the usage increase of the services will lead to a cost increase.

SUMMARY OF THE INVENTION

In view of such a problem, the present invention aims at providing a file management apparatus, a file management method and a program that reduce the count of the use of time stamp adding services and thereby reduce the cost for time stamping.

In order to achieve the above object, the file management apparatus of the present invention, which is for managing registered files, comprises: a selecting part operable to select a plurality of files from the registered files; an integrating part operable to integrate data stored in the selected files and store the integrated data in a single file; and a time stamping part operable to calculate a hash value of the single file, obtain a time stamp generated based on the hash value, and add the time stamp to the single file.

BRIEF DESCRIPTION OF THE DRAWINGS

These and other objects, advantageous effects and features of the invention will become apparent from the following description thereof taken in conjunction with the accompanying drawings which illustrate specific embodiments of the invention.

In the drawings.

DESCRIPTION OF THE PREFERRED EMBODIMENTS

Embodiment 1

Brief Overview of Structure

Figure 1:
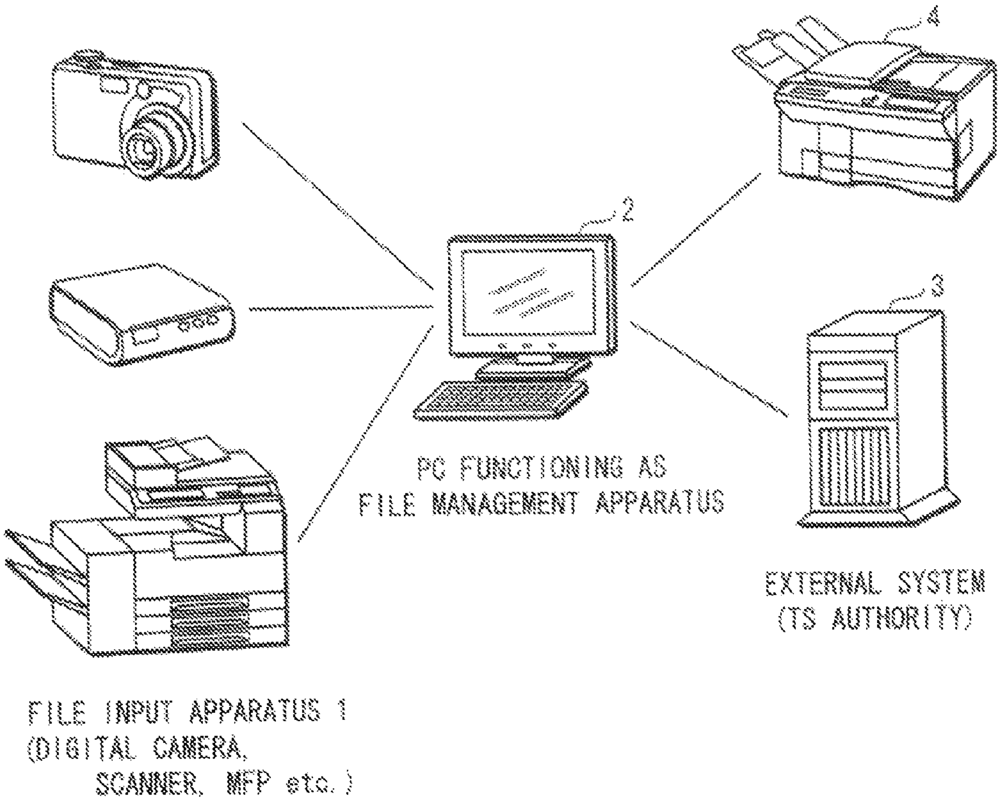
FIG. 1 shows an integrated system to which a file management apparatus 2 of the present invention is applied.

FIG. 1 shows an integrated system to which a file management apparatus of the present invention is applied. A personal computer 2, which reads a program and thereby functions as a file management apparatus, is connected to an external system 3, such as a time stamp authority, via a network. In addition, the personal computer 2 is internally connected to a file input apparatus 1, such as a digital camera, a scanner or an MFP (Multi Function Peripherals), and a printer 4 via LAN, USB and RS232C cables.

The file input apparatus 1 optically scans contents on paper, such as receipts, and obtains image data having the same paper size as the scanned paper.

The file management apparatus 2 integrates multiple pieces of image data obtained from the file input apparatus 1 to a single piece, transmits a hash value of a file storing therein the integrated image data to the time stamp authority 3, and requests generation of a time stamp. The file management apparatus 2 receives a time stamp from the time stamp authority 3, and adds the time stamp to the file from which the hash value was generated.

The time stamp authority 3 generates a time stamp by coupling the hash value of the file storing therein the integrated image data with time information, and transmits the generated time stamp back to the file management apparatus 2.

Thus concludes the brief description of the system. Prior to the description of the file management apparatus 2, a characteristic feature of this apparatus—the way of integrating image data—is explained.

<Details of Image Data Integration>

Figure 2:
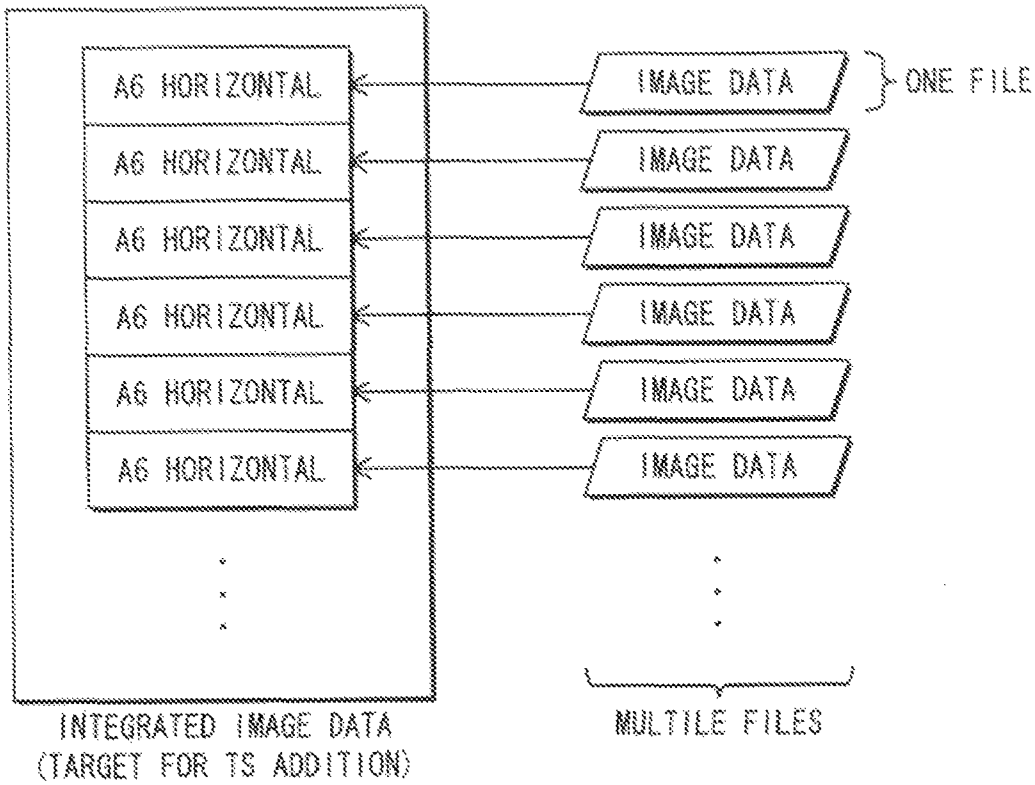
FIG. 2 shows image data integration performed by the file management apparatus 2.

FIG. 2 shows image data integration performed by the file management apparatus 2. Multiple pieces of image data to be integrated are shown on the right side; image data obtained after integration is shown on the left side. The size of each piece of the image data to be integrated is A6 size, for example. The file management apparatus 2 reads an image data piece from each of the multiple files, and the obtained pieces of plain image data are arranged, for instance, vertically. The multiple pieces of image data arranged in this way fit within a larger sheet of paper (e.g. A3). The file management apparatus 2 stores the integrated image data in a single file as a piece of image data having the size of the larger sheet of paper.

Thus concludes the description of the image data integration. The following explains the state of image data being stored in a recording medium.

Figure 3:
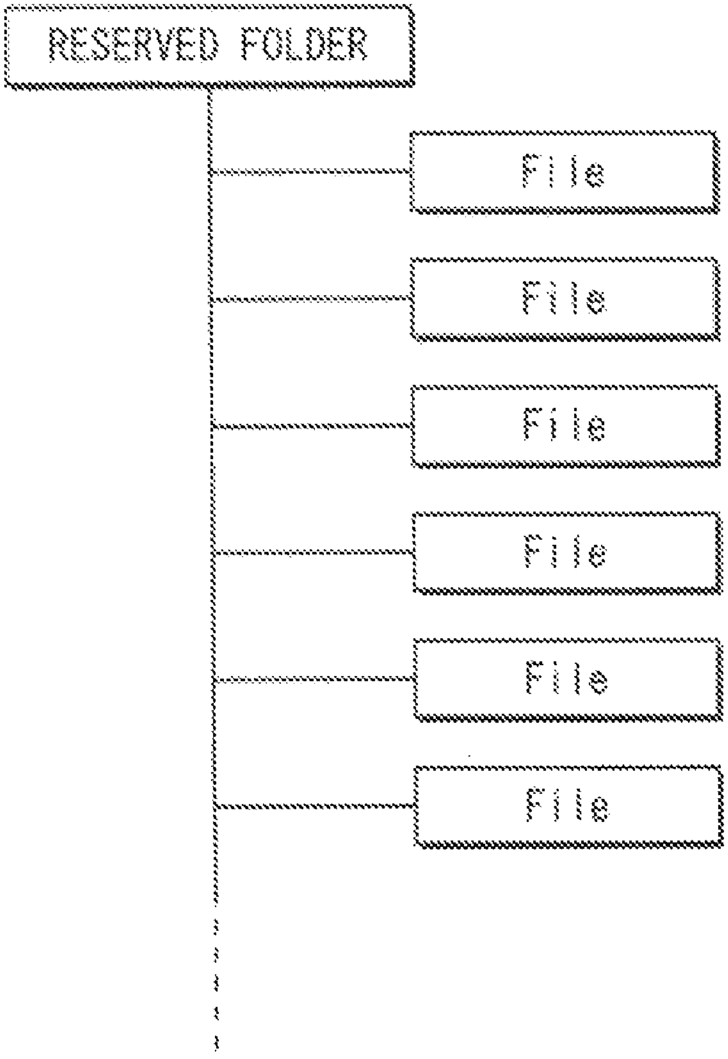
FIG. 3 shows the way image data pieces to be integrated exist in a recording medium.

FIG. 3 shows the way image data pieces to be integrated exist in a recording medium. The example shown in the figure illustrates that multiple files are stored in RESERVED FOLDER. RESERVED FOLDER is described in detail later with reference to FIGS. 7 and 10. Image data pieces to be integrated are respectively stored in one file. Each file is then placed in RESERVED FOLDER.

Thus concludes the description of the state of image data being stored in a recording medium. The following gives a detailed description of the files.

<Internal Structure of File>

Figure 4:
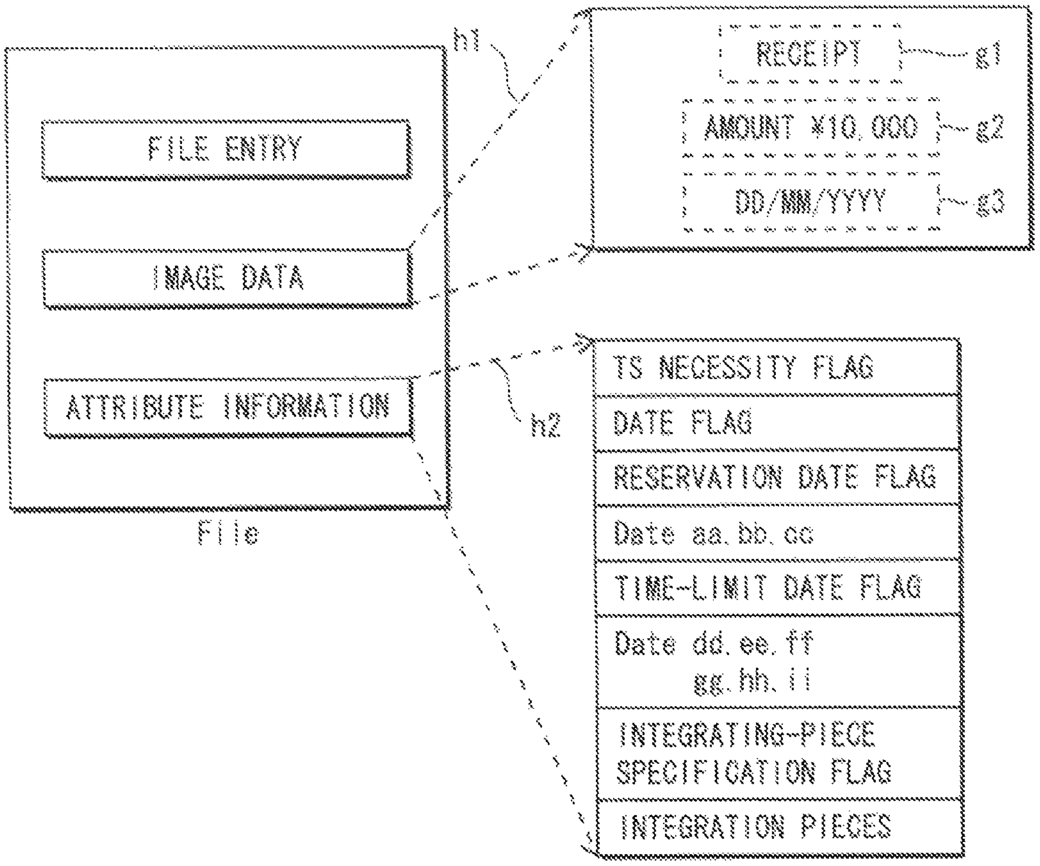
FIG. 4 shows an internal structure of a file.

FIG. 4 shows the internal structure of each file. As shown in the figure, the file includes a file entry, image data and attribute information. The file entry is management information of the file, and the explanation is omitted here since it is the same as one used in a normal file system.

The image data has been created by performing compression coding on plain image data which was obtained by optically scanning a receipt. The lead line h1 shows up-close details of the internal structure of the image data. As shown by the lead line, the image data includes, for example, a character image g1 corresponding to the title of the receipt, a character image g2 corresponding to the received amount of money, a character image g3 corresponding to the data on which the receipt was issued. These character images are converted into character codes by the OCR process, and thereby the file management apparatus 2 is able to determine whether the image data can be a target of the time stamp addition. In addition, by judging whether a character image representing the received amount of money or a character image representing the date appears at a predetermined position on the paper, the file management apparatus 2 is capable of determining whether the image data should be excluded from targets of the time stamp addition.

The lead line h2 shows up-close details of the internal structure of the attribute information. As shown by the lead line, the attribute information is composed of: a time-stamp necessity flag; a date flag; a reservation date flag; a reservation date; a time-limit date flag, a time limit; an integrating-piece specification flag; and integration pieces.

The "time-stamp necessity flag" indicates whether the image data included in the file is a target of the time stamp addition.

The "date flag" indicates whether a time requirement is set for the implementation of the time stamp addition—i.e. whether there is a specification regarding a reservation date or a time limit.

The "reservation date flag" indicates whether a reservation date is specified for the implementation of the time stamp addition as a time requirement.

The "reservation date" indicates, in the case where a reservation date is specified for the implementation of the time stamp addition as a time requirement, the reservation date (aa.bb.cc).

The "time-limit date flag" indicates whether a time limit is set for the implementation of the time stamp addition as a time requirement.

The "time limit" indicates, in the case where a time limit is set for the implementation of the time stamp addition as a time requirement, the commencement (dd.ee.ff) and termination (gg.hh.ii) of the time limit.

The "integrating-piece specification flag" indicates an intention of limiting the count of image data pieces to be integrated to a certain number, rather than integrating image data pieces with no restriction. If there is such an intention, this flag is set to ON; when there is no such an intention, it is set to OFF.

The "integration pieces" indicates the certain number for the limitation.

Thus concludes the description of the attribute information of files. The attribute information is set by receiving user operations made on a displayed property menu (a screen for setting time stamp reservation information) shown in FIG. 5.

With the buttons of "DO NOT MAKE TS RESERVATION" and "RESERVE TS", the user's intention of whether adding a time stamp is received. The time-stamp necessity flag is set by an operation on one of these buttons.

The button of "RESERVATION ONLY" receives the user's intention of making such a reservation but not adding a time limit for the time stamp addition. When this intention is received, the date flag is set to OFF.

Figure 6:
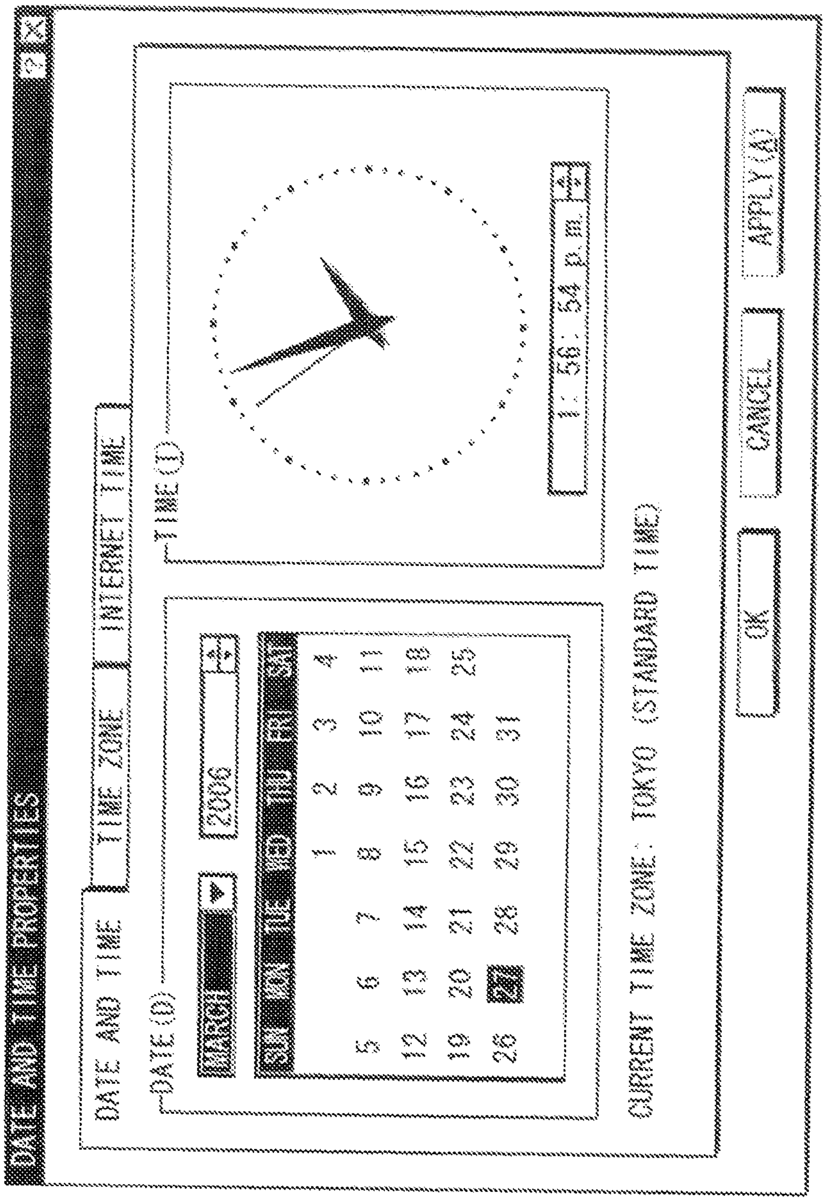
FIG. 6 shows a screen for date and time specification.

The button of "SPECIFY RESERVATION DATE FOR TS ADDITION" is for receiving a specification of a date on which a time stamp addition is performed (a reservation date of time stamp addition). When the button is set to ON, the box of "DATE SPECIFICATION" located on the right-hand side is enabled. A click on the box causes a screen for date and time specification of FIG. 6 to pop up. The reservation date is set by receiving an operation on this screen.

When the button of "ADD TS WITHIN SPECIFIED DAYS AFTER REGISTRATION" is set to ON, the number entry box below the button becomes active, which allows the user to enter a number indicating the days within which the time stamp addition should be performed. The time-limit date flag is set by an operation on this button.

When the check box of “SPECIFICATION OF INTEGRATION PIECES” is ticked, the file-number entry box on the right-hand side becomes active, which allows the user to enter a number indicating the pieces of files to be integrated. The count of integration pieces is set by this entry.

On the other hand, the “OK” button for confirming the present specification and the “CANCEL” button for canceling the present selection are provided at the bottom of the menu in the same manner as in a normal menu.

Thus concludes the description of the files. Details of RESERVED FOLDER is explained next.

<Internal Structure of RESERVED FOLDER>

Figure 7:
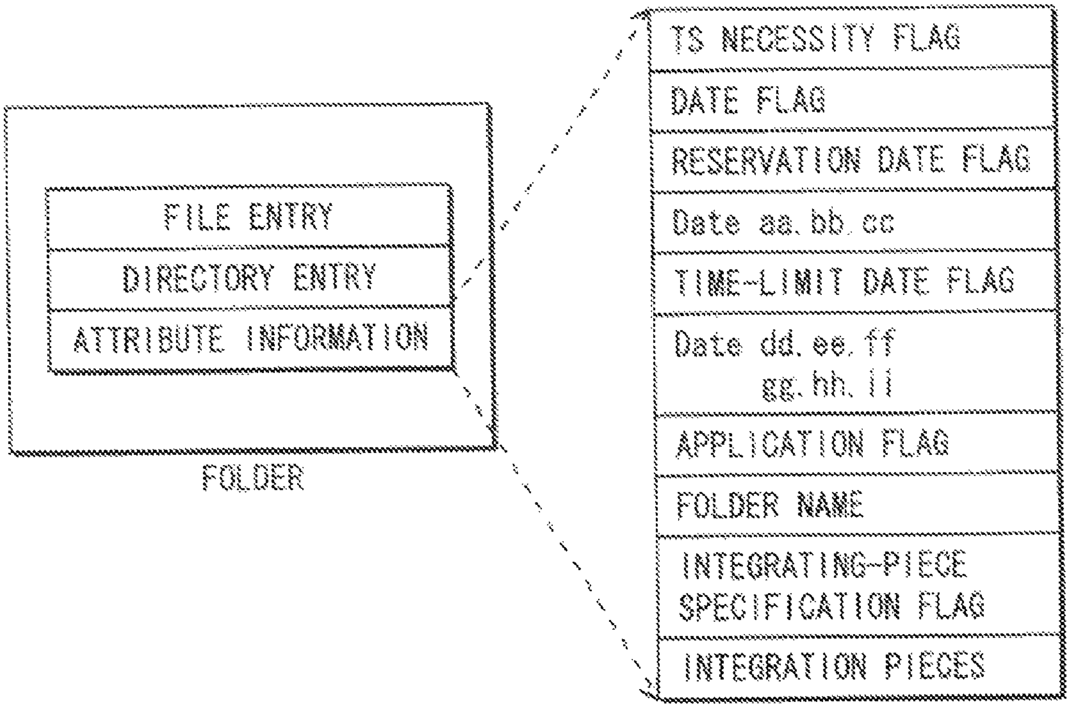
FIG. 7 shows an internal structure of RESERVED FOLDER.

FIG. 7 shows an internal structure of RESERVED FOLDER. As shown in the figure, the folder includes a file entry, a directory entry and attribute information. The file entry is management information on files present in the folder while the directory entry is management information on subfolders of the folder. Since these entries are not any different from those used in a normal file system, the descriptions are omitted here. The attribute information is composed of: a time-stamp necessity flag; a date flag; a reservation date flag; a reservation date; a time-limit date flag; a time limit; an application flag; a folder name; an integrating-piece specification flag; and integration pieces.

The “time-stamp necessity flag” indicates whether image data pieces included in files of the folder are targets of the time stamp addition.

The “date flag” indicates whether, with respect to image data pieces included in files of the folder, a time requirement is set for the implementation of the time stamp addition—i.e. whether there is a specification regarding a reservation date or a time limit.

The “reservation date flag” indicates, with respect to image data pieces included in files of the folder, whether a reservation date is specified for the implementation of the time stamp addition as a time requirement.

The “reservation date” indicates, in the case where a reservation date is specified for the implementation of the time stamp addition as a time requirement, the reservation date (aa.bb.cc).

The “time-limit date flag” indicates, with respect to image data pieces included in files of the folder, whether a time limit is set for the implementation of the time stamp addition as a time requirement.

The “time limit” indicates, in the case where a time limit is set for the implementation of the time stamp addition as a time requirement, the commencement (dd.ee.ff) and termination (gg.hh.ii) of the time limit.

The “application flag” indicates whether image data pieces included in all files of the folder are made to be targets for reservation of the time stamp addition.

The “folder name” indicates, in the case where image data pieces of not all the files are made to be targets for reservation of the time stamp addition, the name of a folder which is positioned under the folder and is to be made as a target for reservation of the time stamp addition.

The “integrating-piece specification flag” indicates, regarding image data pieces included in files of the folder, an intention of limiting the count of the image data pieces to be integrated to a certain number, rather than integrating image data pieces with no restriction. If there is such an intention, this flag is set to ON; when there is no such an intention, it is set to OFF.

The “integration pieces” indicates the certain number for the limitation.

Thus concludes the description of the attribute information of RESERVED FOLDER. The attribute information is set by receiving user operations made on a displayed property menu (a screen for setting time stamp reservation information) shown in FIG. 8.

Figure 5:
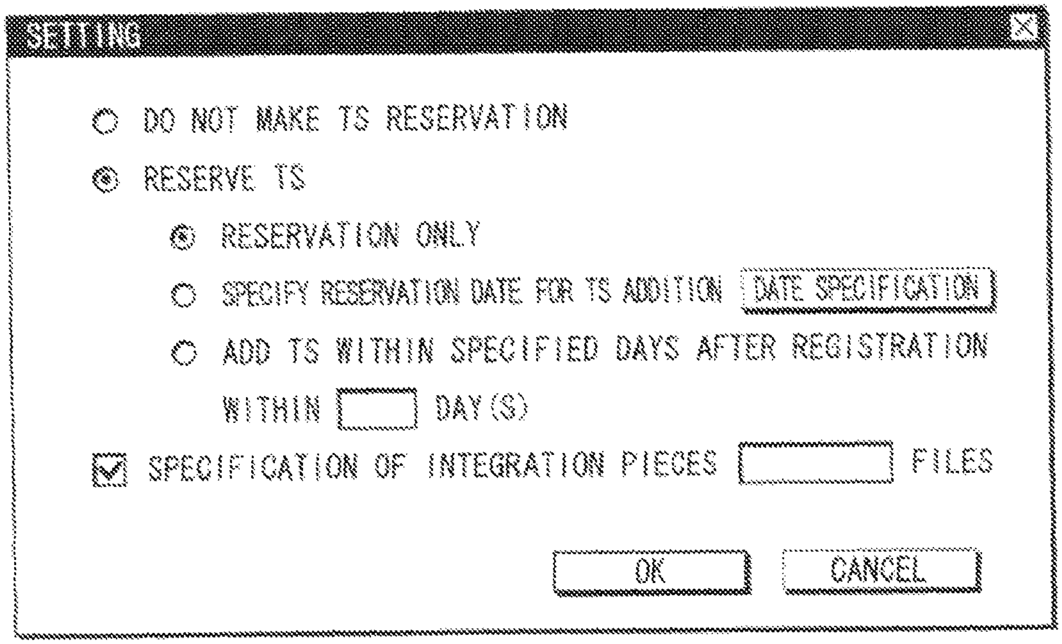
FIG. 5 shows a property menu.

Here, differences from FIG. 5 will be described.

The button of “APPLY TO ALL FILES” is for receiving an intention of applying a reservation of the time stamp addition to all the files in the folder. The application flag is set by an operation on this button.

The button of “SPECIFY FOLDER” is for receiving a specification of limiting, from among the files in the folder, files to which a reservation of the time stamp addition is applied. When the button is set to ON, the file-path entry box below the button becomes active, allowing the user to specify a file path of a file to which a reservation of the time stamp addition is applied.

Based on such attribute information of files and folders, the process of integrating image data pieces is performed. Thus concludes the description regarding the integration of image data pieces. The following explains the internal structure of the file management apparatus 2 of the present invention.

<Structure of File Management Apparatus 2>

Figure 9:
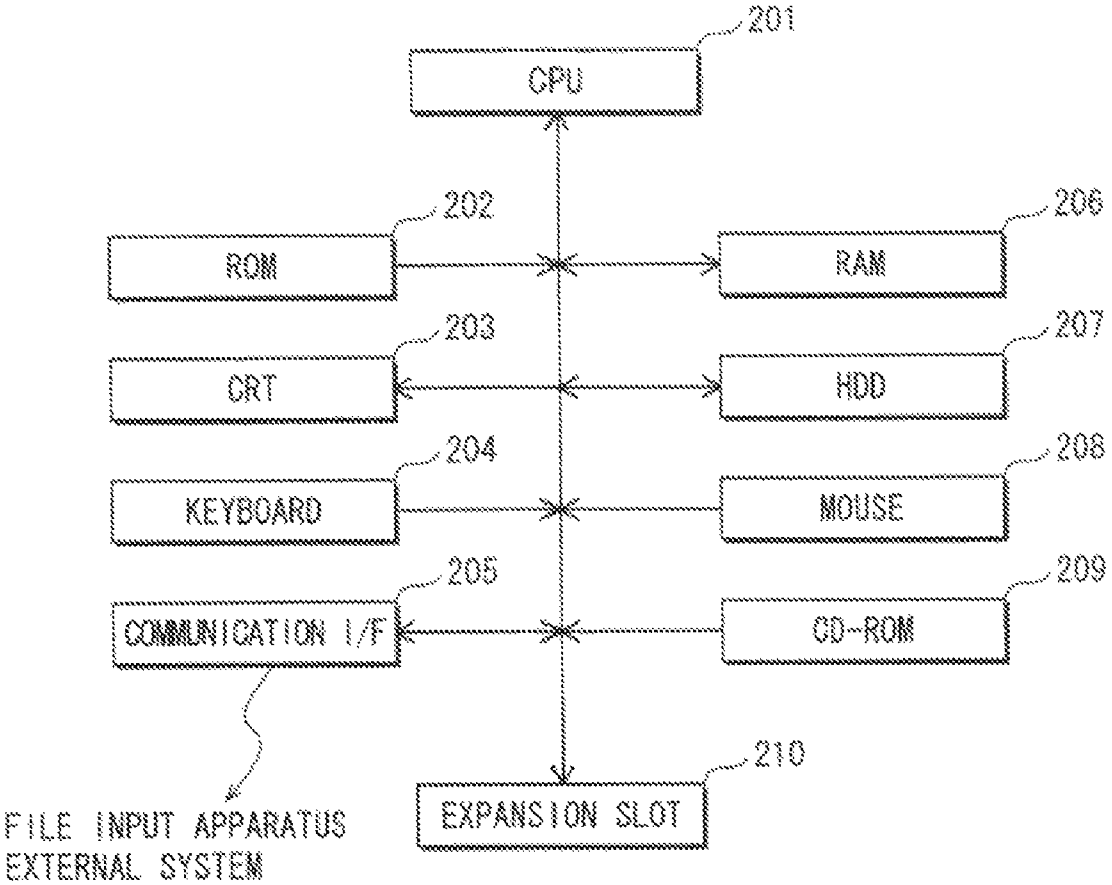
FIG. 9 is a block diagram showing a structure of the file management apparatus 2.

FIG. 9 is a block diagram showing a structure of the file management apparatus 2. The file management apparatus includes: a CPU 201; a ROM 202; a RAM 206; a CRT display 203; a key board 204; a communication interface 205; a hard disk 207; a mouse 208; a CD-ROM 209; and an expansion slot 210, which are connected via buses so as to be able to communicate with each other.

The communication interface 205 is connected to an external network, LAN cables and USB cables, and thereby receives images captured by a digital camera, images read by a scanner, and text files and images stored in an MFP, and reversely outputs image data stored in the hard disk 207 of the file management apparatus 2 to the MFP and printer 4.

The hard disk 207 stores therein: OS; text editing software; image editing software; application software for communicating with input and output apparatuses, such as a digital camera, a scanner, an MFP and the like, to thereby read and output image data from/to them; and programs including browsers, emails, and FTP software for communicating with an external apparatus to perform data transmission and reception. When the power is turned on, the hard disk 207 starts the OS. Then, in response to start instructions from the keyboard 204 and mouse 208, the hard disk 207 reads specified programs to the RAM 206, and the CPU 201 subsequently decodes and executes these programs. Note that the OS uses Windows so that most of the operations, in addition to the task management and memory management, can be conducted in a GUI environment.

Figure 10A:
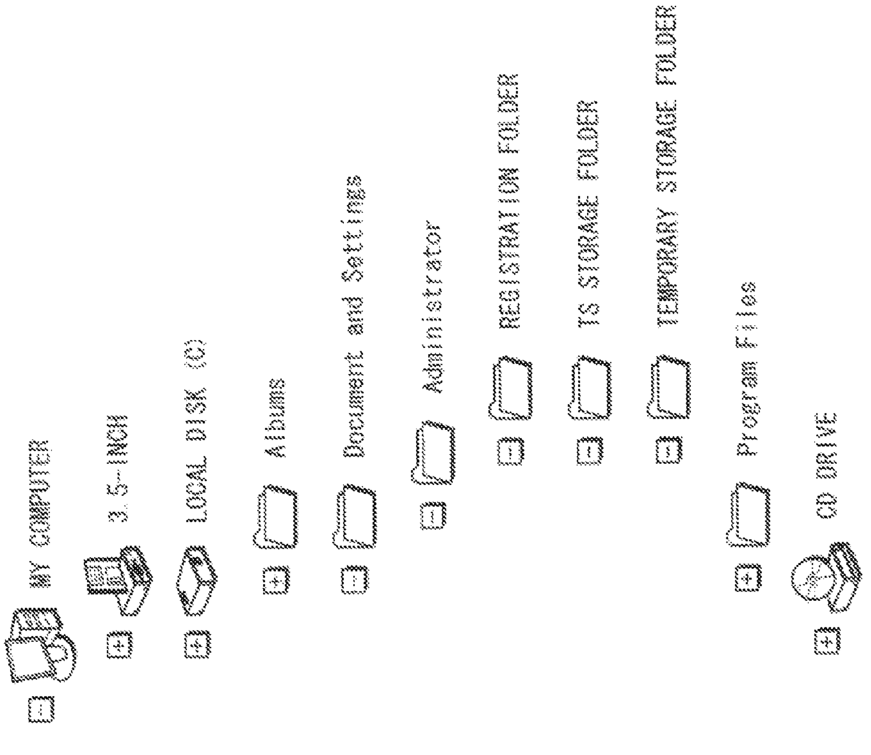
FIG. 10A shows a directory structure in a hard disk 207.

FIG. 10A shows a directory structure in the hard disk 207, having MY COMPUTER as the root directory, directly under which FLOPPY DISC FD and LOCAL DISK (C) and CD DRIVE are connected. According to the example shown in the figure, folders of Albums, Document and Settings and Program Files are stored in LOCAL DISK.

Document and Settings folder stores therein Administrator folder, which stores therein REGISTRATION FOLDER, TS STORAGE FOLDER and TEMPORARY STORAGE FOLDER.

Figure 10B:
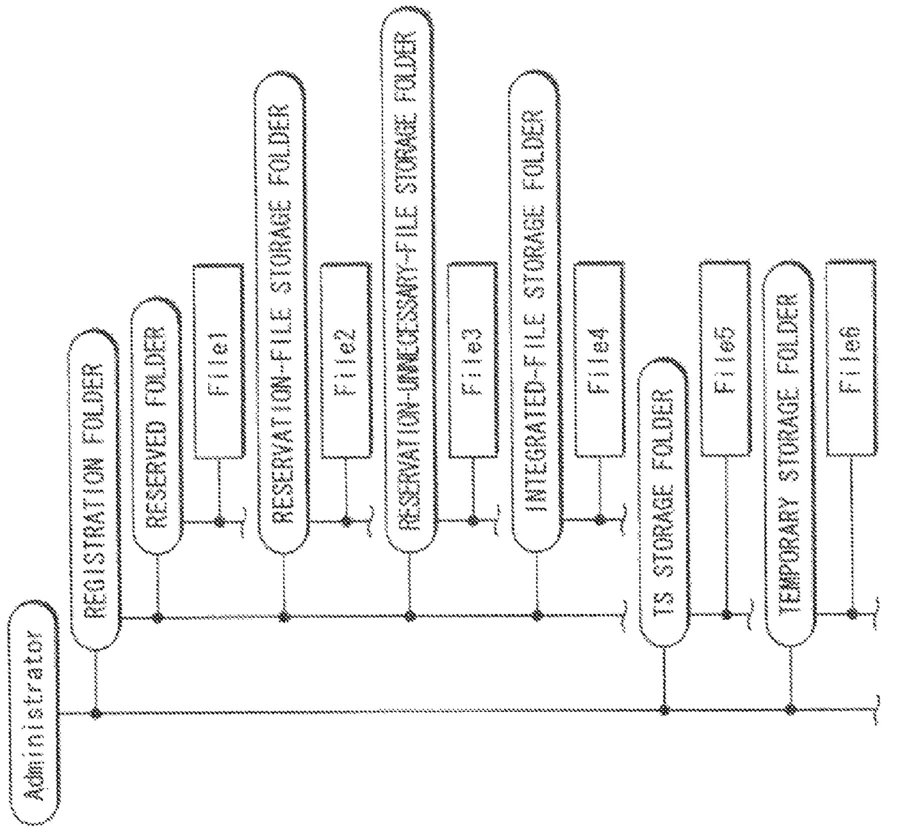
FIG. 10B shows details of REGISTRATION FOLDER.

FIG. 10B shows details of REGISTRATION FOLDER. REGISTRATION FOLDER stores therein RESERVED FOLDER, RESERVATION-FILE STORAGE FOLDER, RESERVATION-UNNECESSARY FILE STORAGE FOLDER and INTEGRATED-FILE STORAGE FOLDER.

Figure 8:
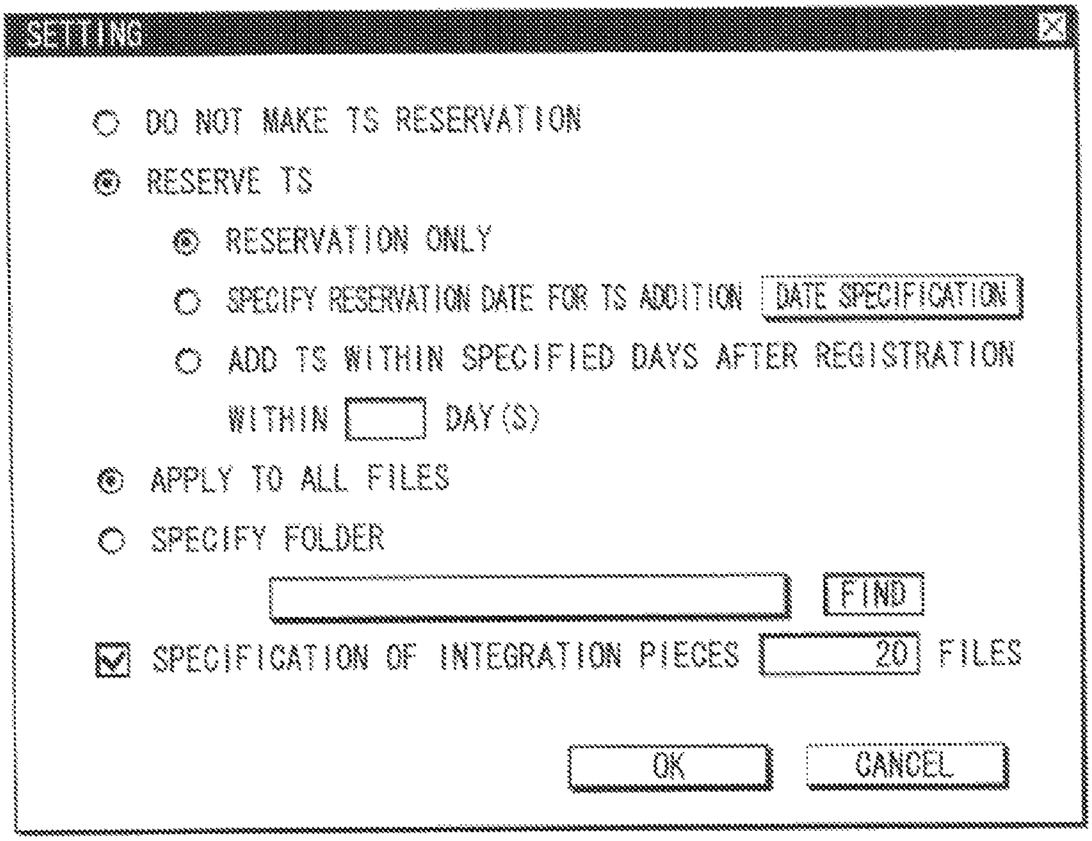
FIG. 8 shows a property menu.

RESERVED FOLDER is a folder shown in FIG. 7, and has an attribute that has been set on the screen, of FIG. 8, for setting time stamp reservation information. Files under the folder have common attribute information.

RESERVATION-FILE STORAGE FOLDER stores therein, from among files temporarily stored in TEMPORARY STORAGE FOLDER, files to which "RESERVE TS" has been set on the screen for setting time stamp reservation information.

RESERVATION-UNNECESSARY-FILE STORAGE FOLDER stores therein files for which the time stamp addition is not required.

INTEGRATED-FILE STORAGE FOLDER stores therein files, each of which is created by integrating image data pieces of multiple files.

TS STORAGE FOLDER stores therein files to which time stamps created by the time stamp authority 3 have been added.

TEMPORARY STORAGE FOLDER temporarily stores therein files of, for example, image data received from input and output apparatuses, such as a digital camera, a scanner, an MFP and the like.

Program Files stores therein various programs necessary for the present invention—for example, text editing software, image editing software, and compression decoding software used for decoding compressed image data.

<Operations of File Management Apparatus>

Figure 11A:
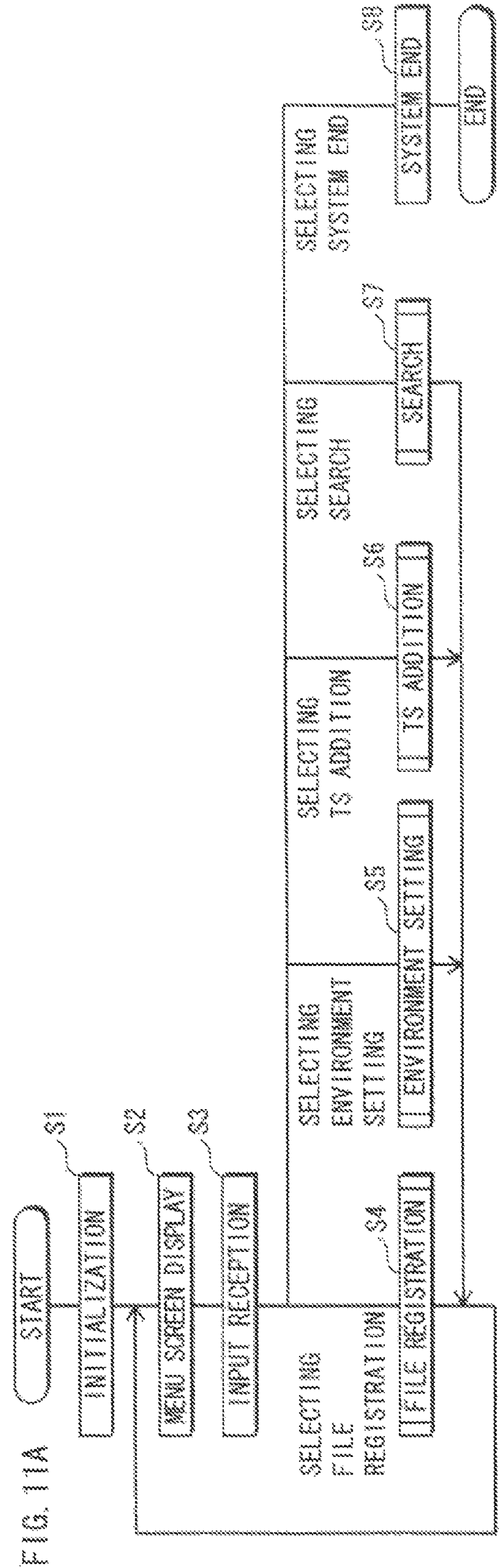
FIG. 11A is a flowchart showing procedures of the overall processes of the file management apparatus 2.

The following describes operations of the file management apparatus 2 of the present invention. The main routine is a program indicating procedures of the overall processes. The main routine is explained with the aid of FIG. 11A.

After performing initialization (Step S1), the file management apparatus 2 displays a menu screen (Step S2) and receives an input from the user (Step S3). on the menu screen, when "file registration" is selected, the file management apparatus 2 performs a file registration process (Step S4). When "environment setting" is selected, the file management apparatus 2 performs an environment setting process (Step S5). When "TS addition" is selected, the file management apparatus 2 performs a time stamp process (Step S6). When "search" is selected, the file management apparatus 2 performs a search process (Step S7). When "system end" is selected, the file management apparatus 2 ends the system (Step S8).

Figure 11B:
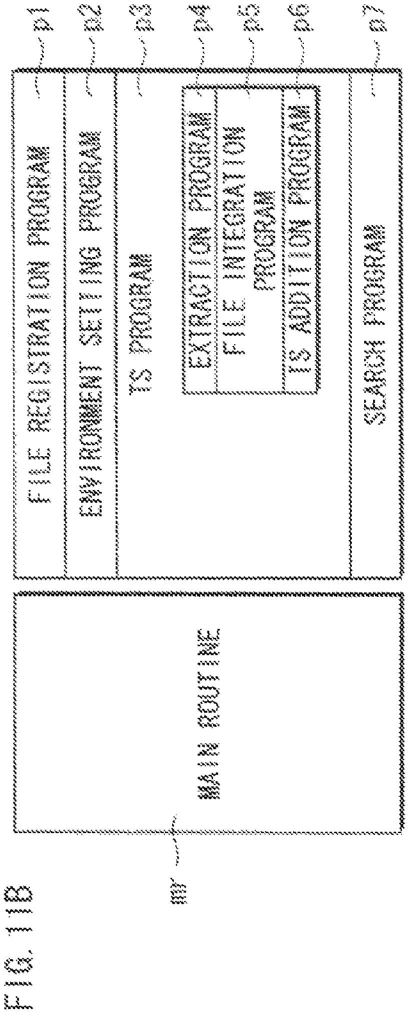
FIG. 11B shows a program structure.

FIG. 11B shows a program structure. Programs included are, in addition to the main routine mr, subroutines such as a file registration program p1, an environment setting program p2, a time stamp program p3, and a search program p7. The time stamp program p3 is composed of an extraction program p4, a file integration program p5 and a time stamp addition program p6. The following describes details of each subroutine.

<File Registration>

Figure 12:
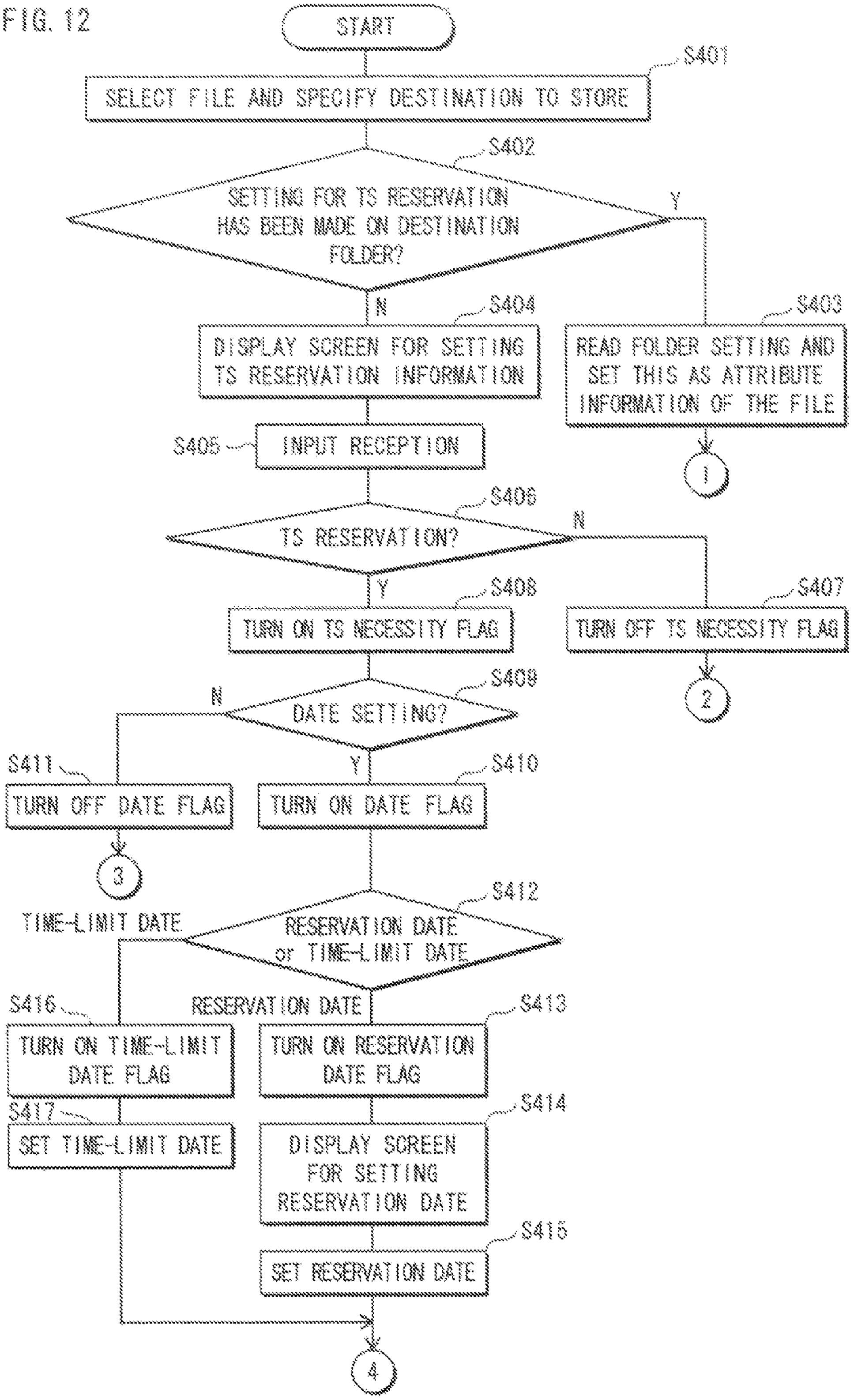
FIG. 12 is a flowchart showing procedures of a file registration process.
Figure 13:
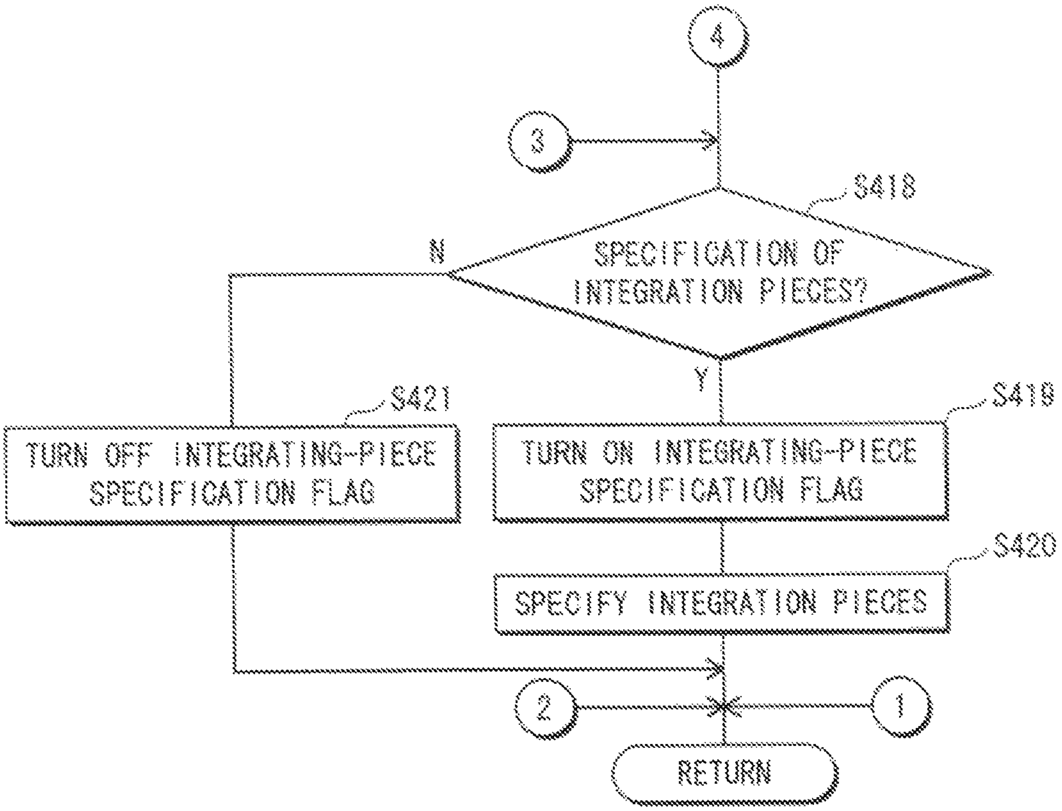
FIG. 13 is a flowchart showing procedures of the file registration process.

Details of the file registration process are described here. The file registration process is a process of setting the attribute information shown in FIG. 4 based on user's operations corresponding to the property menu of FIG. 5. FIGS. 12 and 13 are flowcharts showing the file registration process.

First, the file management apparatus 2 selects, from among files stored in TEMPORARY STORAGE FOLDER, a file to be registered and specifies a destination folder to store it (Step S401). The file management apparatus 2 judges whether reservation of the time stamp addition has been set for the destination folder (Step S402). In the case where the reservation has been set, the file management apparatus 2 reads the folder setting and sets this setting as the attribute information of the file (Step S403). In the case where a reservation has yet to be set, the file management apparatus 2 displays the screen for setting time stamp reservation information (Step S404) so as to receive an input from the user (Step S405). When a selection is made on "DO NOT MAKE TS RESERVATION" (Step S406: No), the file management apparatus 2 turns off the time-stamp necessity flag (Step S407). On the other hand, when a selection is made on "RESERVE TS" (Step S406: Yes), the file management apparatus 2 turns on the time-stamp necessity flag (Step S408).

Next, when a selection is made on "RESERVATION ONLY" (Step S409: Yes), the file management apparatus 2 turn on the date flag (Step S410). When a selection is made on "SPECIFY RESERVATION DATE FOR TS ADDITION," (Step S412) the file management apparatus 2 turns on the reservation date flag (Step S413), displays the screen for setting a reservation (Step S414), and sets a reservation date according to an input from the user (Step S415). When a selection is made on "ADD TS WITHIN SPECIFIED DAYS AFTER REGISTRATION," the file management apparatus 2 turns on the time-limit date flag (Step S416) and sets a time limit date (Step S417). When a selection is made on "SPECIFY RESERVATION DATE FOR TS ADDITION" or "ADD TS WITHIN SPECIFIED DAYS AFTER REGISTRATION," the file management apparatus 2 turns off the date flag (Step S411). After the date flag is turned off, or a reservation date or a time limit date is set, if there is a specification of the integration pieces (Step S418), the file management apparatus 2 turns on the integrating-piece specification flag (Step S419) and sets the integration pieces in accordance with an input from the user (Step S420). When there is no specification of the integration pieces, the file management apparatus 2 turns off the integrating-piece specification flag (Step S421).

<Environment Setting>

Figure 14:
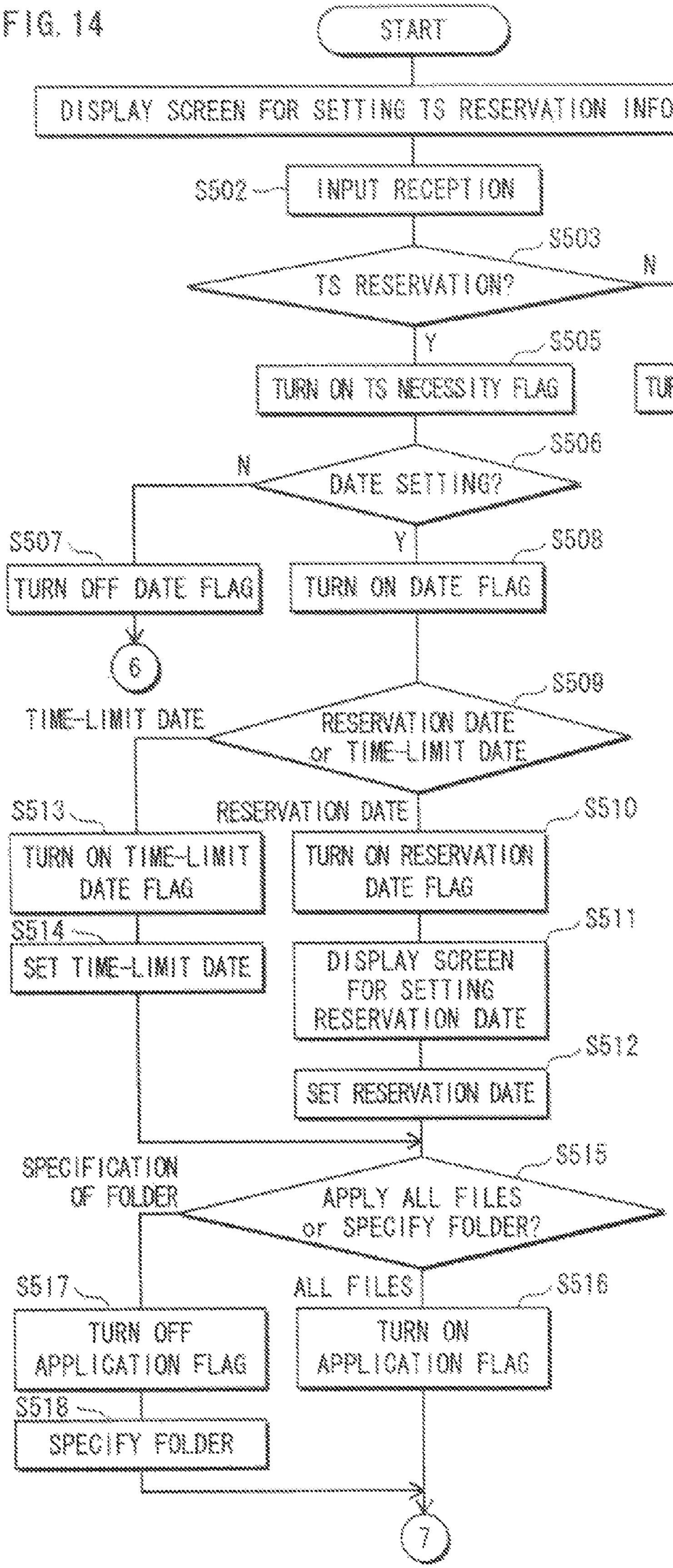
FIG. 14 is a flowchart showing procedures of an environment setting process.
Figure 15:
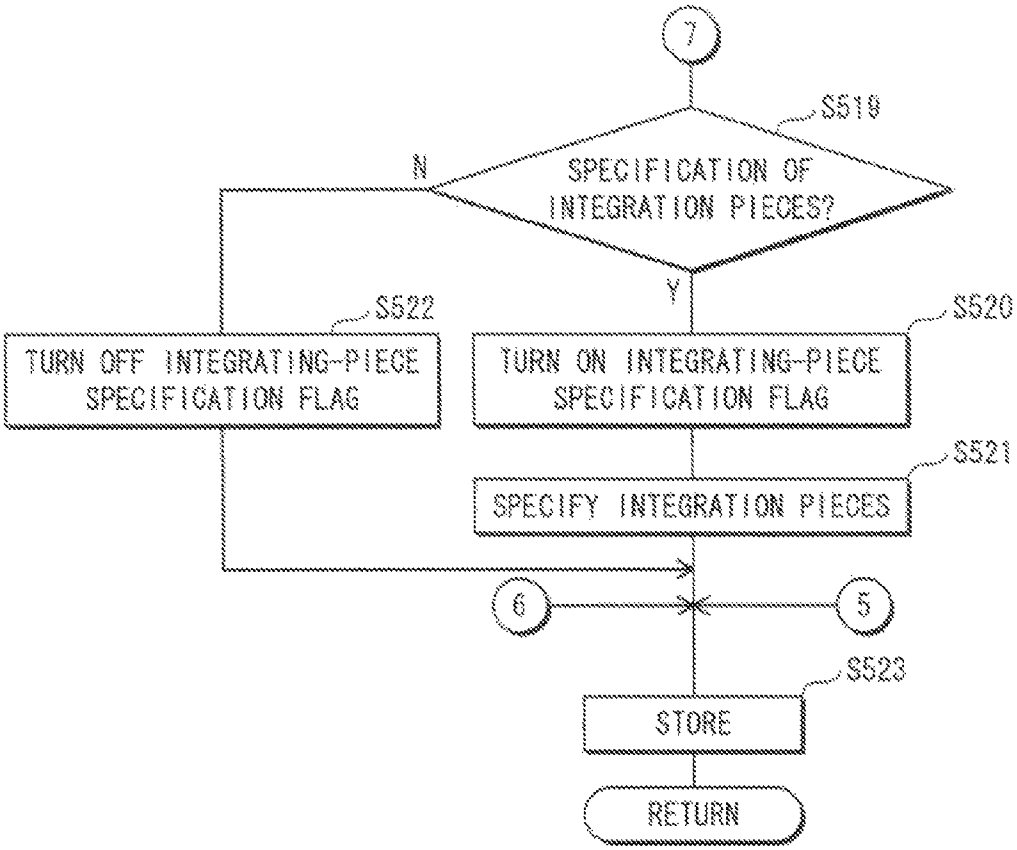
FIG. 15 is a flowchart showing procedures of the environment setting process.

The next describes details of the environment setting process. The environment setting process is a process of setting the attribute information shown in FIG. 7 based on user's operations made on the property menu of FIG. 8. FIGS. 14 and 15 are flowcharts showing the environment setting process.

First, when "environment setting" is selected on the menu screen, the file management apparatus 2 displays the screen for setting time stamp reservation information (Step S501) and receives an input from the user (Step S502). When a selection is made on "DO NOT MAKE TS RESERVATION" (Step S503: No), the file management apparatus 2 turns off the time-stamp necessity flag (Step S504). On the other hand, when a selection is made on "RESERVE TS" (Step S503: Yes), the file management apparatus 2 turns on the time-stamp necessity flag (Step S505). When a selection is made on "RESERVATION ONLY" (Step S506: Yes), the file management apparatus 2 turns on the date flag (Step S508). When a selection is made on "SPECIFY RESERVATION DATE FOR TS ADDITION," (Step S509) the file management apparatus 2 turns on the reservation date flag (Step S510), displays the screen for setting a reservation (Step S511), and sets a reservation date (Step S512). When a selection is made on "ADD TS WITHIN SPECIFIED DAYS AFTER REGISTRATION," the file management apparatus 2 turns on the time-limit date flag (Step S513) and sets a time limit date (Step S514). When a selection is made on "SPECIFY RESERVATION DATE FOR TS ADDITION" or "ADD TS WITHIN SPECIFIED DAYS AFTER REGISTRATION," the file management apparatus 2 turns off the date flag (Step S507). When a selection is made on "APPLY TO ALL FILES," (Step S515) the file management apparatus 2 turns on the application flag (Step S516). When a selection is made on "SPECIFY FOLDER,"

the file management apparatus 2 turns off the application flag (Step S517) and sets a folder in accordance with an input from the user (Step S518). If there is a specification of the integration pieces (Step S519), the file management apparatus 2 turns on the integrating-piece specification flag (Step S520) and sets the integration pieces in accordance with an input from the user (Step S521). When there is no specification of the integration pieces, the file management apparatus 2 turns off the integrating-piece specification flag (Step S522). Lastly, the file management apparatus 2 stores the setting (Step S523) and ends the process.

<Time Stamp Addition>

Figure 16:
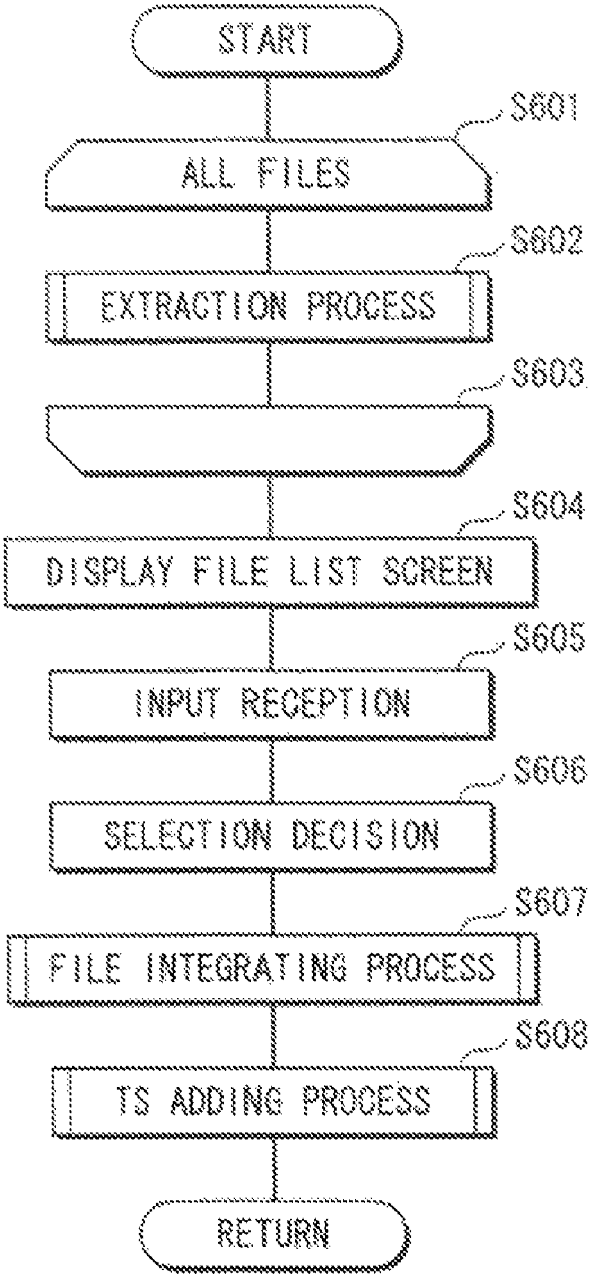
FIG. 16 is a flowchart showing procedures of a time stamp process.

The next describes details of the time stamp process. The time stamp process is a process of performing the integrating process on all files stored in RESERVED FOLDER and RESERVATION-FILE STORAGE FOLDER and adding a time stamp to the result of the integrating process. FIG. 16 is a flowchart showing procedures of the time stamp adding process.

First, the file management apparatus 2 performs the extraction process on all files stored in RESERVED FOLDER and RESERVATION-FILE STORAGE FOLDER (Steps S601-S603). After the extraction process is completed, the file management apparatus 2 displays a list of the extracted files (Step S604) and receives an input from the user (Step S605). According to the user's input, the file management apparatus 2 selects files to be integrated (Step S606). The file management apparatus 2 performs the file integrating process on the selected files (Step S607) and then performs the time stamp adding process (Step S608).

<Extraction Process>

Figure 17:
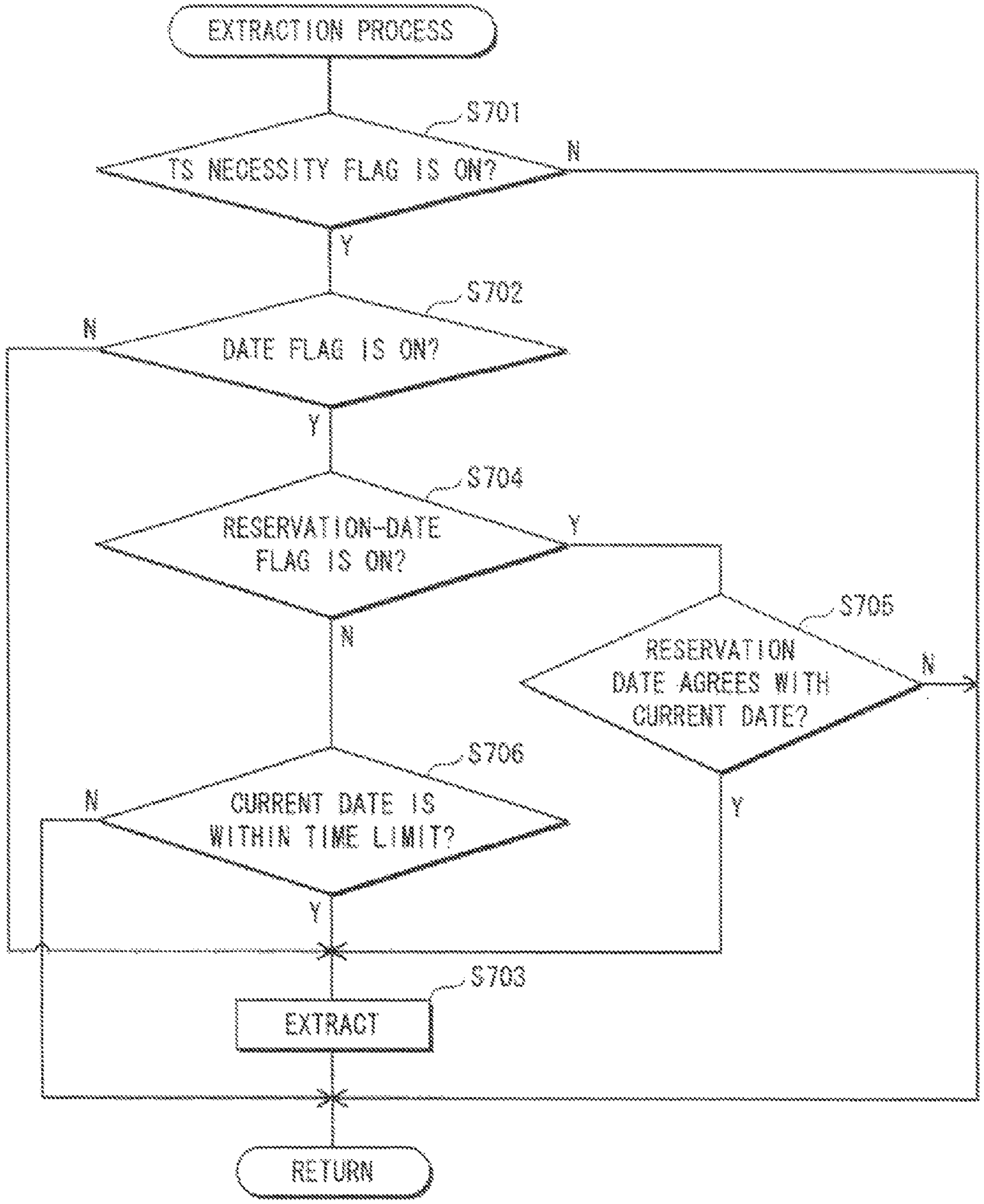
FIG. 17 is a flowchart showing procedures of an extraction process.

The next describes details of the extraction process. The extraction process is a process of extracting, from RESERVED FOLDER and RESERVATION-FILE STORAGE FOLDER, files to which time stamps are to be added, based on the setting of the attribute information. FIG. 17 is a flowchart showing procedures of the extraction process.

First, the file management apparatus 2 judges whether the time-stamp necessity flag of a file is ON (Step S701). When it is ON, the file management apparatus 2 judges whether the date flag is ON (Step S702). When it is OFF, the file management apparatus 2 extracts the file (Step S703). When it is ON, the file management apparatus 2 judges whether the reservation date flag is ON (Step S704). When it is ON, the file management apparatus 2 judges whether the reservation date and the current date agree with each other (Step S705). When they agree, the file management apparatus 2 extracts the file. When the reservation date flag is OFF, the file management apparatus 2 judges whether the current date is within the time limit (Step S706). When it is within the time limit, the file management apparatus 2 extracts the file.

<Screen for Selecting Files for Time Stamp Addition>

Figure 18:
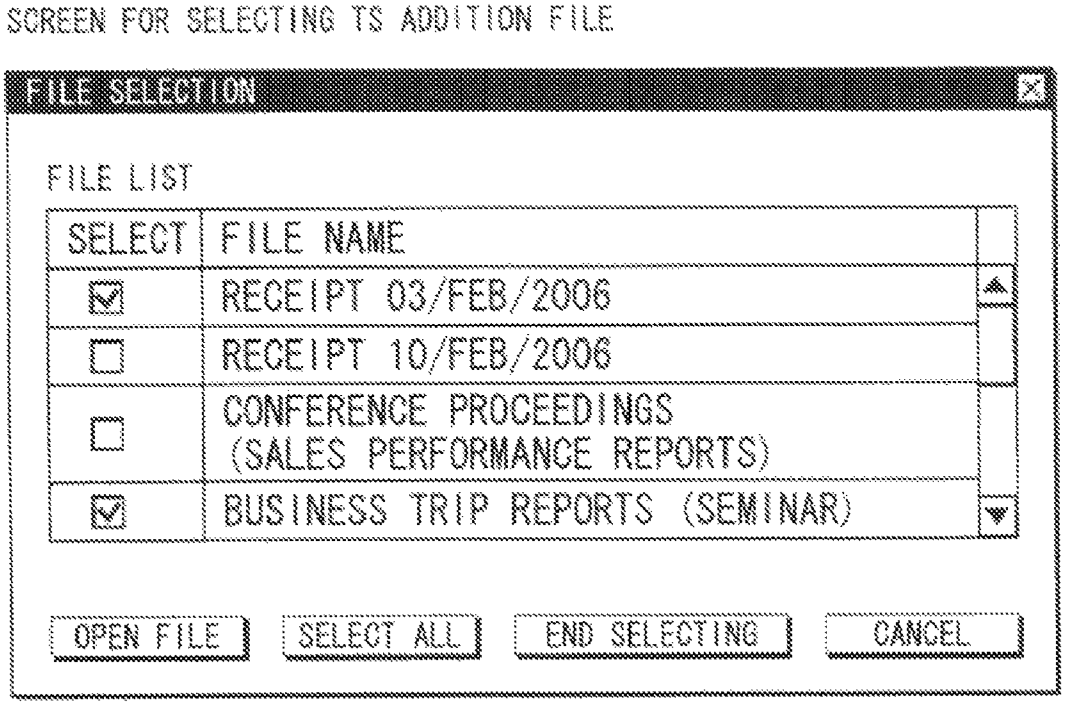
FIG. 18 shows a screen for selecting files to which time stamps are to be added.

The next describes a screen for selecting files to which time stamps are to be added. On this screen, files extracted by the process of FIG. 17 are displayed in a list format, as shown in FIG. 18.

The field of "SELECT" indicates whether a corresponding file has been selected, with or without a tick in the check box.

The field of "FILE NAME" shows a file name of the extracted file.

The button of "OPEN FILE" has a function of opening a file specified by the user in order to check the content of the file.

The button of "SELECT ALL" is for selecting all the extracted files.

The button of "END SELECTING" is for ending the selecting session with a condition in which files whose field of "SELECT" has been ticked are selected.

The button of "CANCEL" is for ending the session with no selection.

By operating the screen for selecting files for time stamp addition, the user is able to make selections on files to which time stamps are to be added.

<File Integrating Process>

Figure 19:
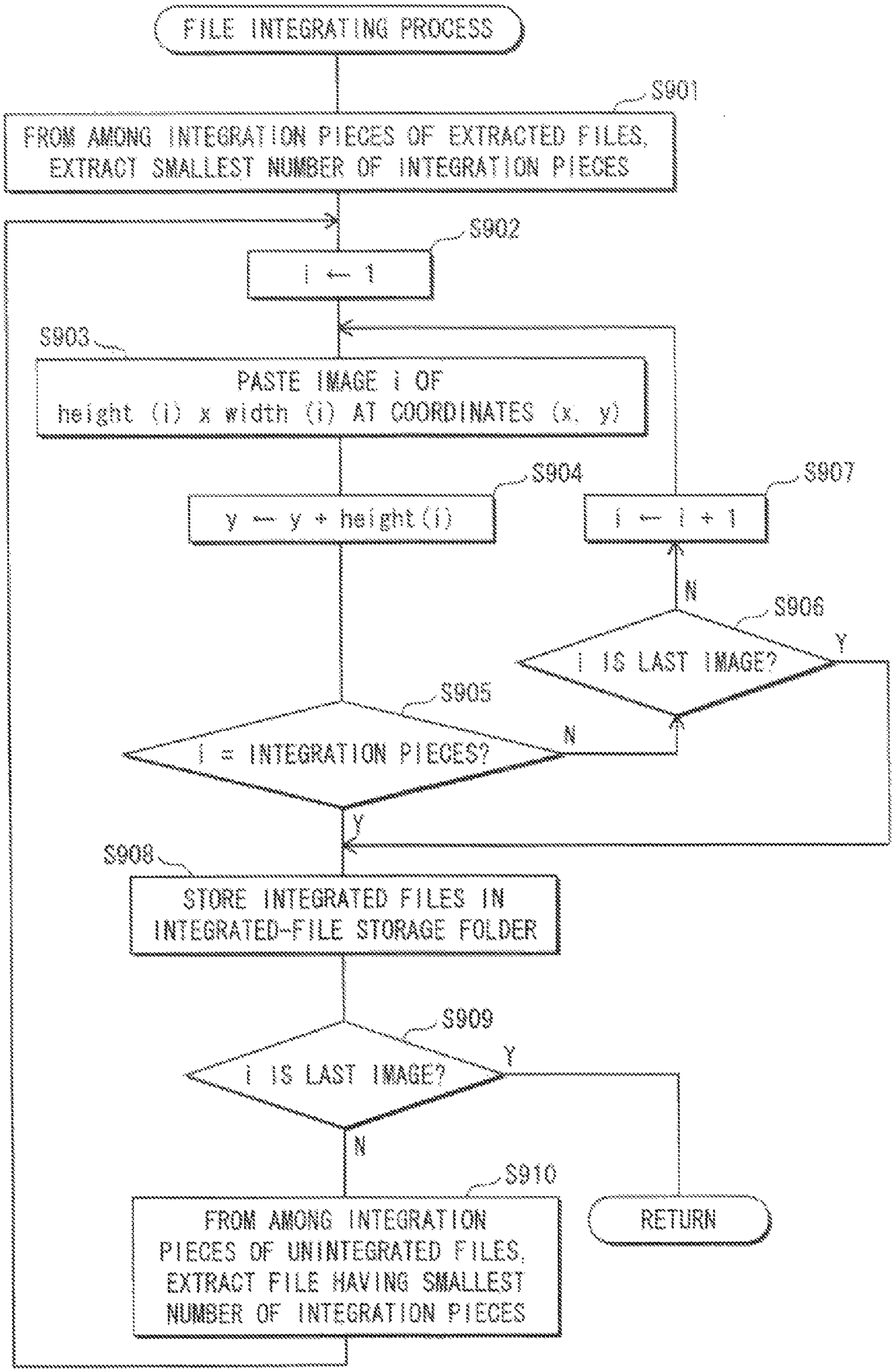
FIG. 19 is a flowchart showing procedures of a file integrating process.

The next describes details of the file integrating process. The file integrating process is a process of performing the integrating process of FIG. 2 on multiple files to which time stamps are to be added and storing, in INTEGRATED-FILE STORAGE FOLDER, a file including image data which has been obtained by the integrating process. FIG. 19 is a flowchart showing procedures of the file integrating process.

FIG. 19 is a flowchart showing procedures of the file integrating process. The image (i) in the figure is, out of multiple image data pieces, one which is to be pasted on the larger sheet of paper. The variable i indicates this image data piece to be pasted. The "coordinates (x, y)" indicate coordinates in the paper, at which the image data piece is pasted. The "width (i)" and "height(i)" indicate the width and height, respectively, of the image data piece (i).

The flowchart shows that the file management apparatus 2 extracts, from among the numbers of the integration pieces of the extracted files, the smallest one (Step S901), then initializes the variable i (Step S902), and moves to a loop process of Steps S903-S910. Subsequently, the file management apparatus 2 pastes the image of height(i)×width(i) at the coordinates (x, y) (Step S903), and thereby the image data piece (i) occupies the area of height(i)×width(i) at the coordinates (x, y) on the paper. Next, the file management apparatus 2 adds height(i) to the coordinate y in order to make this occupied area skipped, whereby updating the coordinate y (Step S904).

The file management apparatus 2 judges whether the variable i and the extracted number of the integration pieces are equal to each other (Step S905). When they are not equal to each other, the file management apparatus 2 judges whether the variable i has become one indicating the last image data piece (Step S906). When there is another image data piece, the file management apparatus 2 updates the variable i (Step S907) and returns to Step S903.

When the variable i is one indicating the last image data piece, or when the variable i is equal to the extracted number of the integration pieces, the file management apparatus 2 stores the integrated file in INTEGRATED-FILE STORAGE FOLDER (Step S908). Then, the file management apparatus 2 again judges whether the variable i has become one indicating the last image data piece (Step S909). That is, if the answer of Step S906 is Yes, the file management apparatus 2 ends the process. On the other hand, when the answer of Step S905 is Yes (the variable i is equal to the extracted number of the integration pieces) and then there is another image data piece (Step S909: No), the file management apparatus 2 newly extracts, from among the numbers of the integration pieces of unintegrated files, the smallest one (Step S910). After initializing the variable i, the file management apparatus 2 again moves to the loop process of Steps S903-S910.

Figure 20:
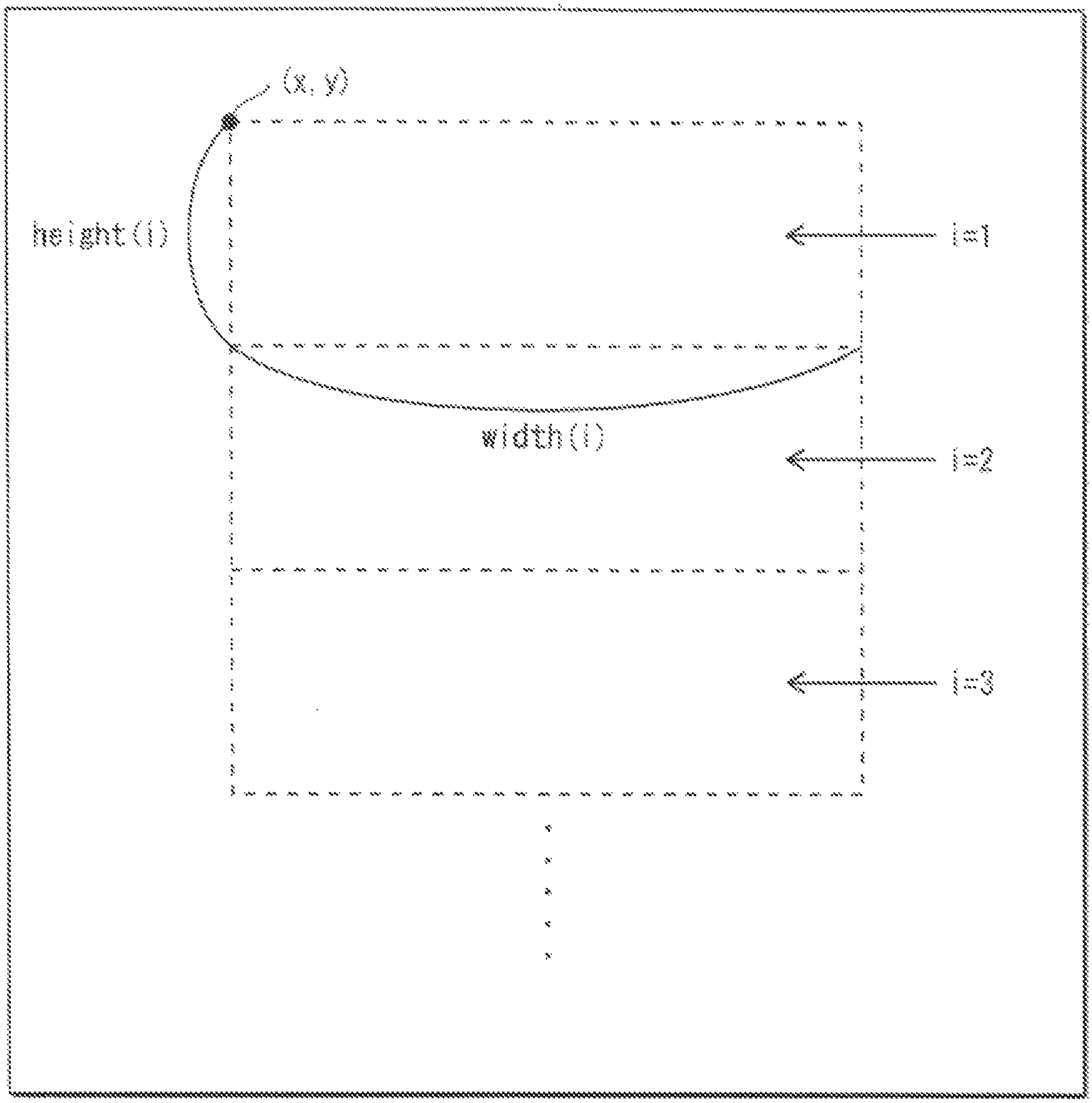
FIG. 20 shows the way each image data piece is pasted.

FIG. 20 shows the manner each image data piece is pasted when the variable i increases as i=1, i=2 and i=3. As can be seen from the figure, new image data pieces do not overlap other image data pieces and are pasted in a downward direction.

<Time Stamp Adding Process>

Figure 21:
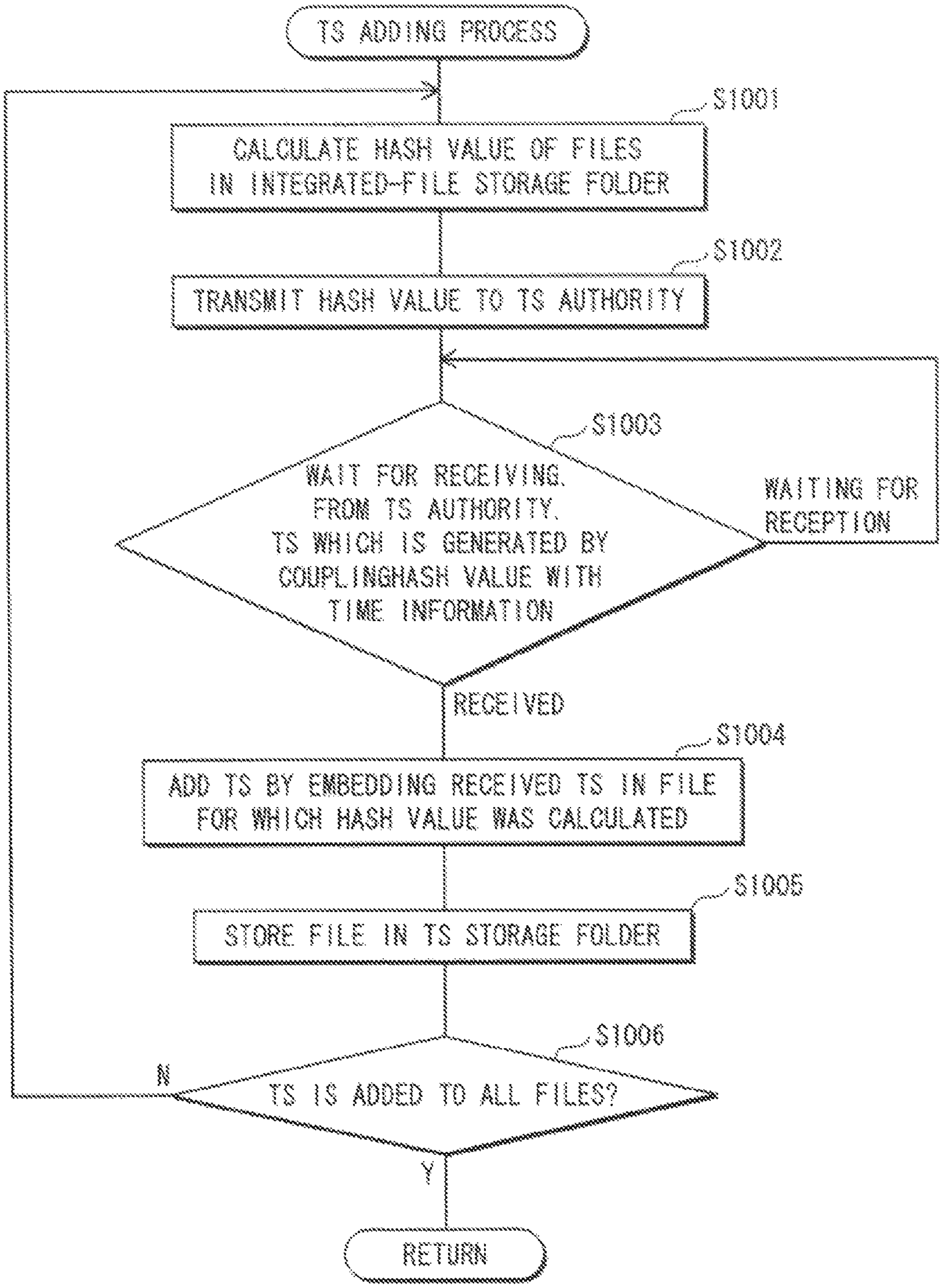
FIG. 21 is a flowchart showing procedures of a time stamp adding process.

The next describes details of the time stamp adding process. The time stamp adding process is a process of adding a time stamp obtained from the time stamp authority 3 to a file in INTEGRATED-FILE STORAGE FOLDER. FIG. 21 is a flowchart showing procedures of the time stamp adding process.

First, the file management apparatus 2 calculates a hash value of the file in INTEGRATED-FILE STORAGE FOLDER (Step S1001). Sending the hash value to the time stamp authority 3 (Step S1002), the file management apparatus 2 waits for receiving, from the time stamp authority 3, a time stamp which is generated by adding time information to the hash value (Step S1003). After receiving it, the file management apparatus 2 realizes the time stamp addition by embedding the received time stamp into the file (Step S1004). The file management apparatus 2 stores the file in TS STORAGE FOLDER (Step S1005). The file management apparatus 2 judges whether time stamps have been added to all the files in INTEGRATED-FILE STORAGE FOLDER (Step S1006). In the case when there is a file to which a time stamp has yet to be added, the file management apparatus 2 moves to Step S1001. When having added a time stamp to all the files, the file management apparatus 2 ends the process.

<Search>

The next describes the search process. The search process is a normal file search. For example, the file management apparatus 2 receives a file name of a registered file by the user's input, and then searches for a corresponding file and displays it.

Embodiment 2

The present embodiment explains specific processes performed in the case when the character images g1 and g3 are processed by OCR as described with FIG. 4 of Embodiment 1. This process is employed, for example, when time stamps are desired to be added to a collection of files that include a specific word, such as "receipt", "invoice" or "conference proceedings".

This process is performed between the selection decision (Step S606) and the file integrating process (Step S607) of FIG. 16.

Figure 22:
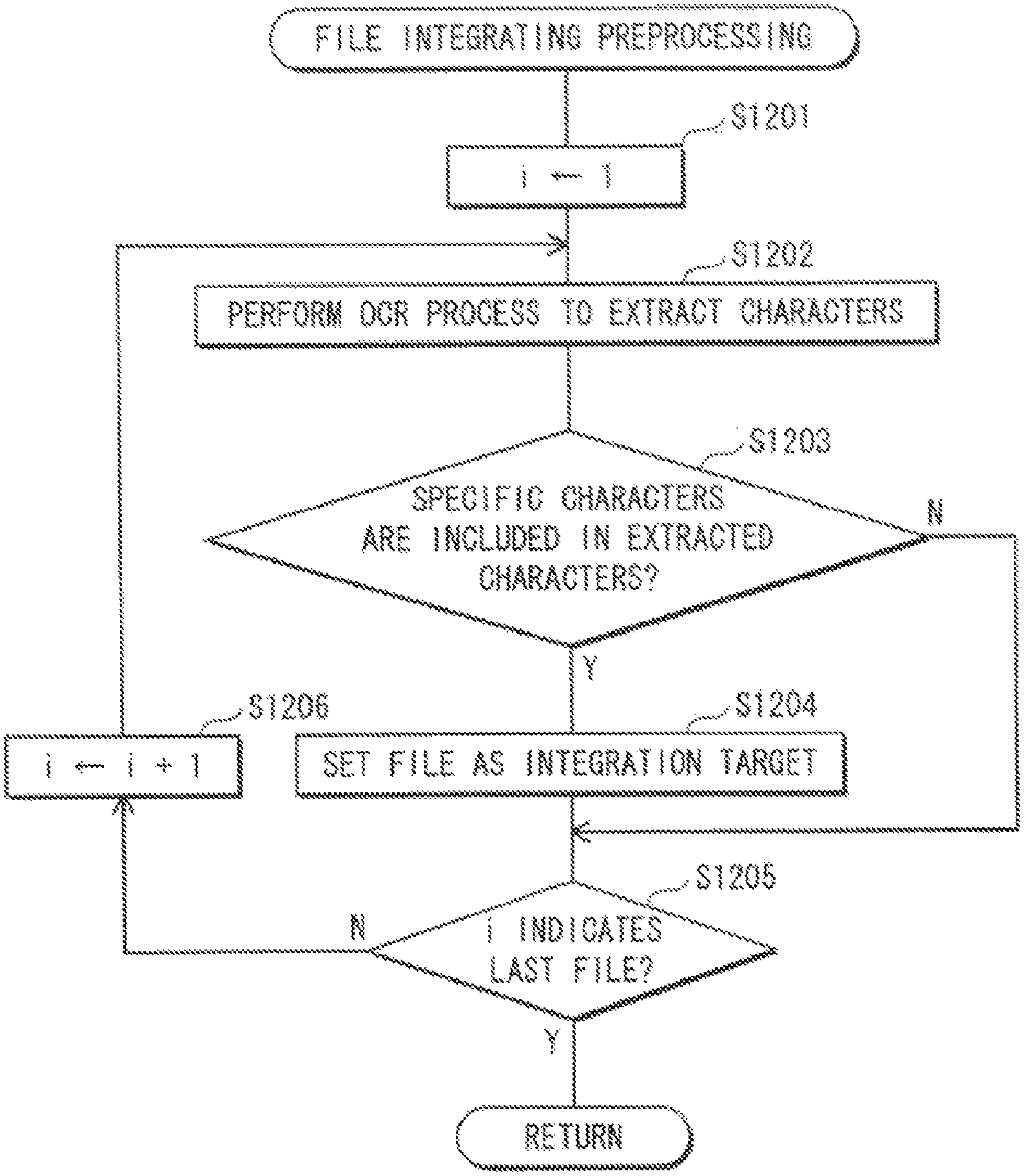
FIG. 22 is a flowchart showing procedures for extracting files that include a predetermined word.

FIG. 22 is a flowchart showing procedures for extracting files that include a word of "receipt," "invoice" or "conference proceedings" in the character image g1. The variable i of the figure indicates one of the files selected in Step S606.

First, the file management apparatus 2 initializes the variable i (Step S1201), then performs the OCR process on the file, and extracts characters (Step S1202). The file management apparatus 2 judges whether a specific word is included in the extracted characters (Step S1203). When the judgment is negative, the file management apparatus 2 does not set the file as an integration target. Here, when the variable i is not one indicating the last file, the file management apparatus 2 then updates the variable i (Step S1206), performs the OCR process on a different file (Step S1202), and repeats the same process. When the variable i is one indicating the last file, the file management apparatus 2 ends the process. When the judgment of Step S1203 is affirmative, the file management apparatus 2 sets the file as an integration target (Step S1204) and then moves to Step S1205.

Figure 23:
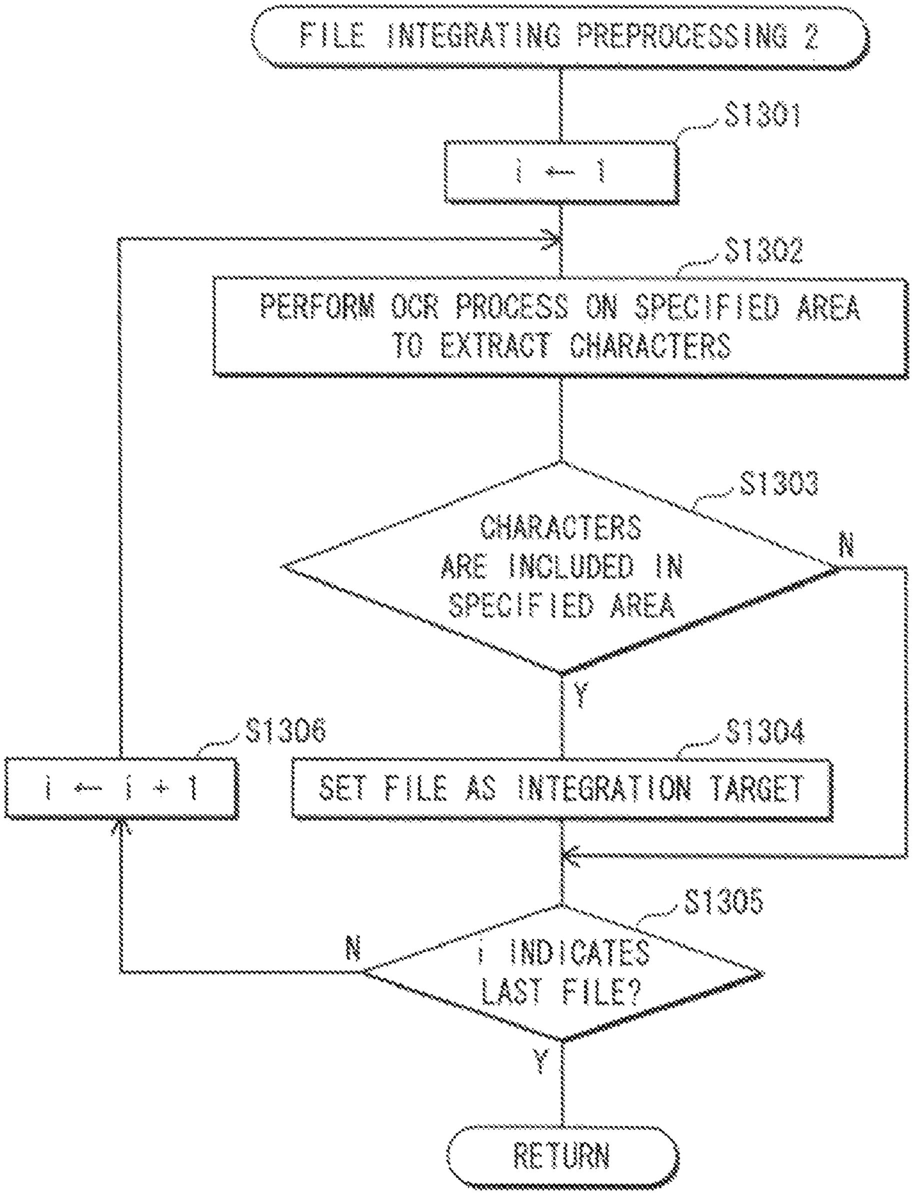
FIG. 23 is a flowchart showing procedures for identifying an invalid receipt with no date.

The next describes a method of performing the OCR process on the character image g3 and judging whether to set a corresponding file as an integration target, based on the presence or absence of a date on a receipt or the like. An area, within receipts, in which the date is written is generally more or less fixed. Accordingly, the presence or absence of a date can be determined by performing the OCR process on such an area. FIG. 23 is a flowchart showing procedures for judging whether a date is written on a receipt to thereby discriminate invalid receipts with no date. The variable i in the figure indicates one of the files selected in Step S606.

First, the file management apparatus 2 initializes the variable i (Step S1301), then performs the OCR process on a specified area of the file, and extracts characters (Step S1302). The file management apparatus 2 judges whether characters are included in the specified area (Step S1303). When the judgment is negative, the file management apparatus 2 does not set the file as an integration target. Here, when the variable i is not one indicating the last file, the file management apparatus 2 then updates the variable i (Step S1306), performs the OCR process on the specified area of a different file (Step S1302), and repeats the same process. When the variable i is one indicating the last file, the file management apparatus 2 ends the process. When the judgment of Step S1303 is affirmative, the file management apparatus 2 sets the file as an integration target (Step S1304) and then moves to Step S1305.

According to this process, invalid receipts with no dates thereon can be discriminated.

Figure 24:
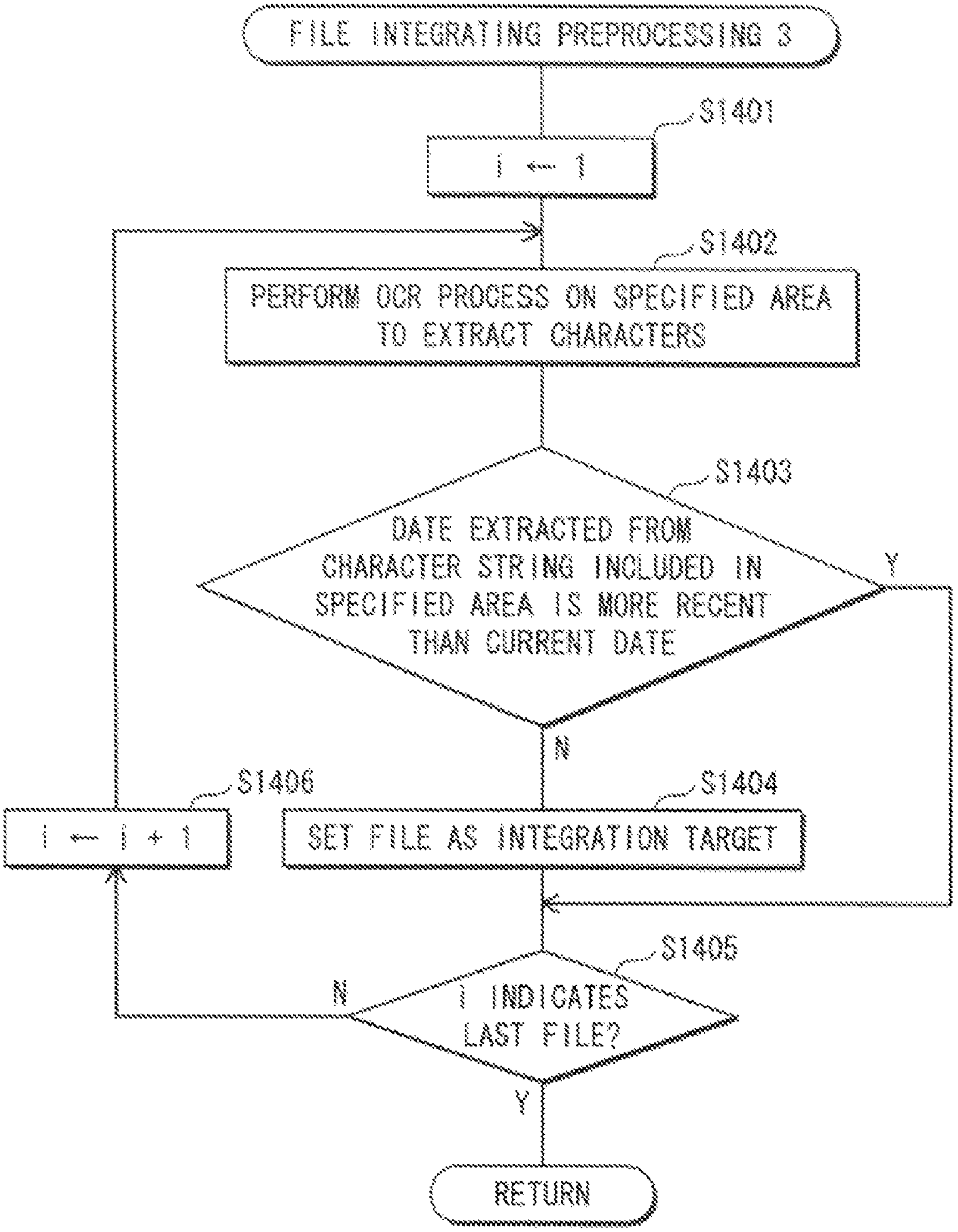
FIG. 24 is a flowchart showing procedures for identifying a file with an invalid date.

However, even if a date is written, it is sometimes the case that the date is invalid. This is, for example, when the written date is later than the current date. FIG. 24 is a flowchart showing procedures for judging the validity of the written date to thereby discriminate files with invalid dates. The variable i in the figure indicates one of the files selected in Step S606.

First, the file management apparatus 2 initializes the variable i (Step S1401), then performs the OCR process on a specified area of the extracted file, and extracts characters (Step S1402). The file management apparatus 2 judges whether a date extracted from a character string included in the specified area is later than the current date (Step S1403). When the judgment is positive, the file management apparatus 2 does not set the file as an integration target. Here, when the variable i is not one indicating the last file, the file management apparatus 2 then updates the variable i (Step S1406), performs the OCR process on the specified area of a different file (Step S1402), and repeats the same process. When the judgment of Step S1403 is negative, the file management apparatus 2 sets the file as an integration target (Step S1404) and then moves to Step S1405.

According to this process, it is possible to prevent a time stamp from being added to a file having an invalid date.

Note that, in the file integrating process performed after each of the processes of FIGS. 22-24 above, the smallest number of the integration pieces is extracted from among the numbers of the integration pieces of the files that have been set as integration targets in Steps S1204, S1304 and S1404. Then, the file integration is repeated the number of times shown by the extracted number.

Embodiment 3

The present embodiment describes the case where files to which time stamps are to be added are integrated by size of printing paper.

The file of the present embodiment includes, as the attribute information, printing paper size information instead of the integrating-piece specification flag and integration pieces.

The "printing paper size information" indicates the size of original paper from which the image data was obtained.

Figure 25:
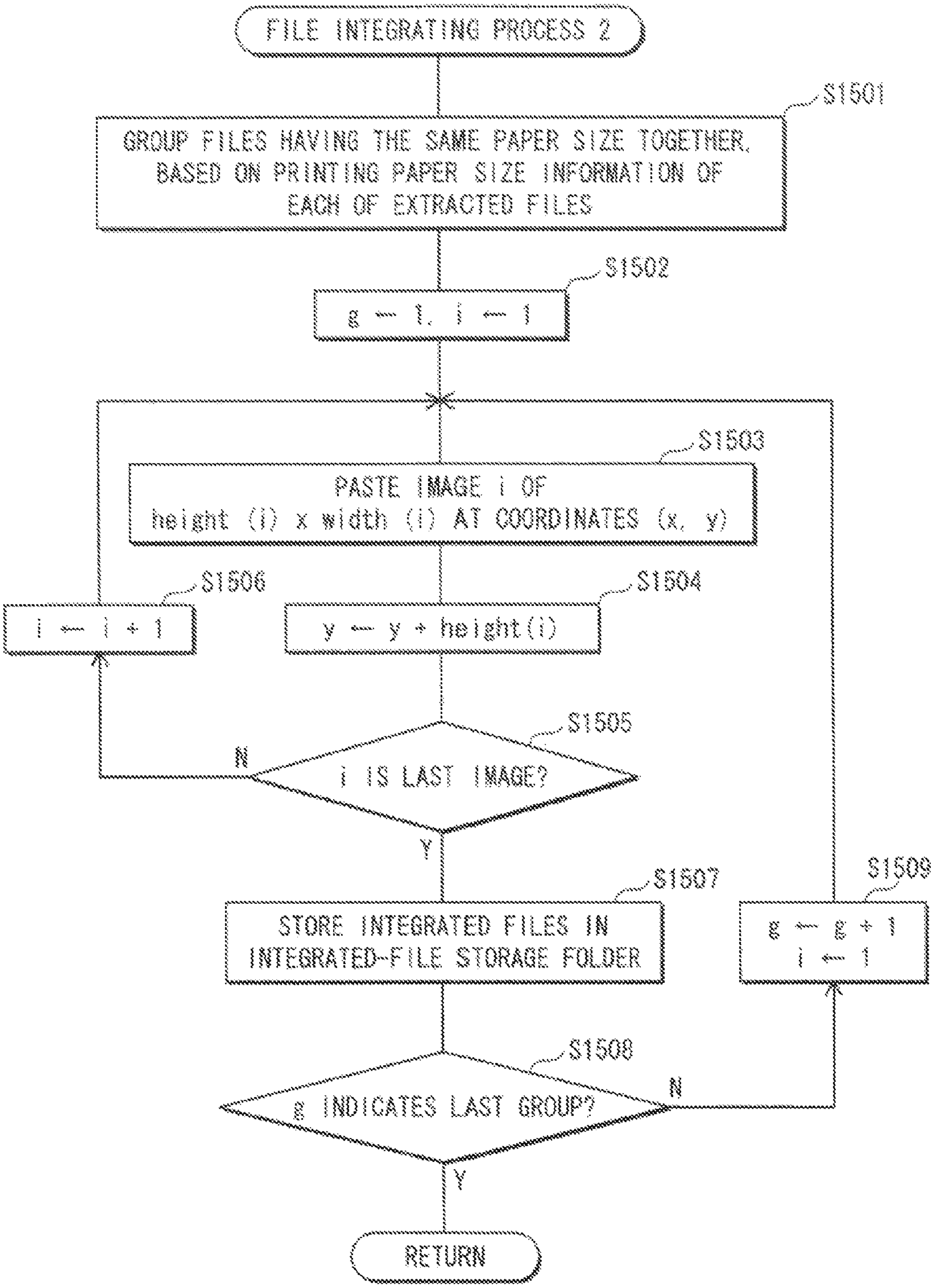
FIG. 25 is a flowchart showing procedures of a file integrating process 2.

FIG. 25 is a flowchart showing procedures of a file integrating process 2. The variable g in the figure indicates one of paper size groups. Since the image (i), variable i, (x, y), width(i) and height(i) are the same as those of FIG. 19, the descriptions are omitted here.

The flowchart shows that the file management apparatus 2 groups files having the same paper size together based on printing paper size information of each of the extracted files (Step S1501), then initializes the variables i and g (Step S1502), and moves to a loop process of Steps S1503-S1509. Subsequently, the file management apparatus 2 pastes the image of height(i)×width(i) at the coordinates (x, y) (Step S1503). Then, the file management apparatus 2 adds height(i) to the coordinate y, whereby updating the coordinate y (Step S1504). The file management apparatus 2 judges whether the variable i has become one indicating the last image data piece (Step S1505). When there is another image data piece, the file management apparatus 2 updates the variable i (Step S1506) and returns to Step S1503.

When the variable i is one indicating the last image data piece, the file management apparatus 2 stores the integrated file in INTEGRATED-FILE STORAGE FOLDER (Step S1507). Then, the file management apparatus 2 judges whether the variable g has become one indicating the last group (Step S1508). When there is another file group of the same paper size, the file management apparatus 2 updates the variable g and initializes the variable i (Step S1509), and then performs the process of S1503 onwards again. When the variable g is one indicating the last group, the file management apparatus 2 ends the file integrating process.

Supplementary Remarks

The present invention has been described based on the preferred embodiments above; however, it is not confined to these embodiments. The following cases are also within the scope of the present invention.

Figure 26:
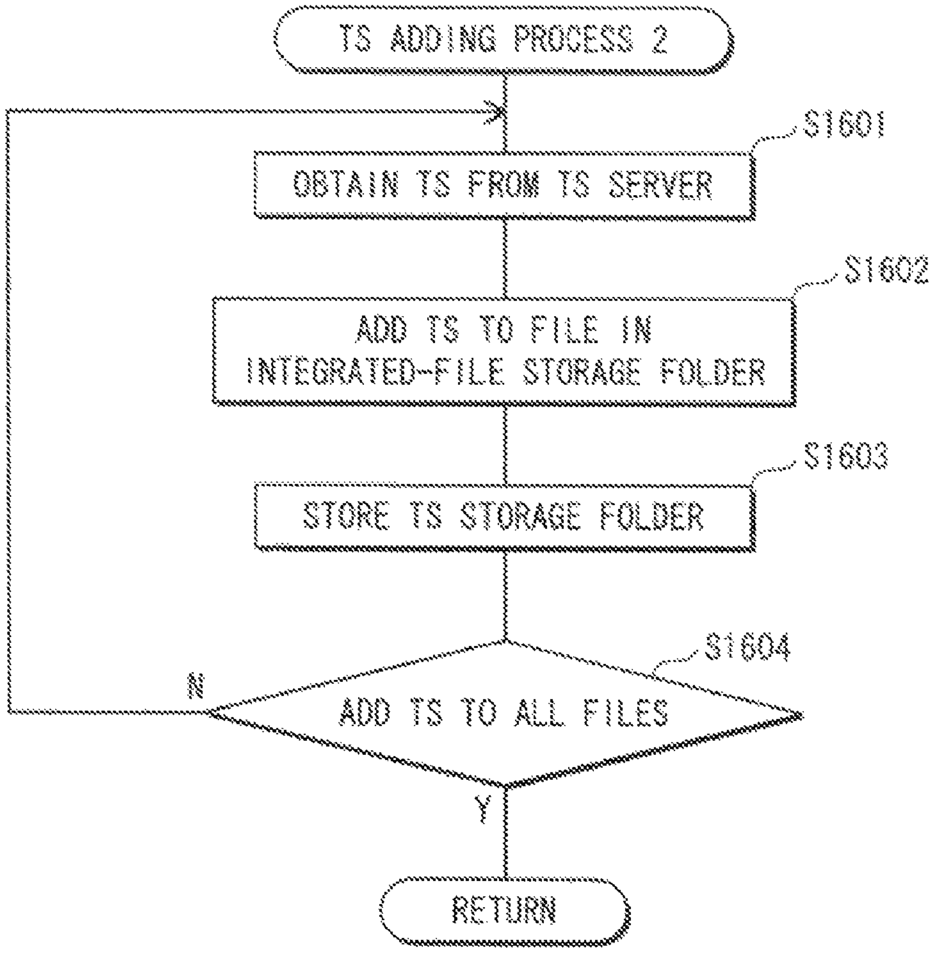
FIG. 26 is a flowchart showing procedures for obtaining a time stamp from a time stamp server and adding the time stamp to a file.

The above embodiments have a structure in which, in order to provide strong evidence, the file management apparatus sends a hash value of the file to an external system (time stamp authority) and then receives therefrom a time stamp which has been generated by adding time information to the hash value. However, in the case, for example, where simply time information is desired to be added to in-house files, the file management apparatus may obtain a time stamp from a time stamp server in the company and add it to a file. The time stamp, here, means mere time information. FIG. 26 is a flowchart showing process procedures performed in such a case. First, the file management apparatus obtains a time stamp from the time stamp server (Step S1601), and adds the time stamp to a file in INTEGRATED-FILE STORAGE FOLDER (Step S1602). Then, the file management apparatus stores the file to which the time stamp has been added in TS STORAGE FOLDER (Step S1603). The file management apparatus judges whether time stamps have been added to all the files in INTEGRATED-FILE STORAGE FOLDER (Step S1604). In the case when there is a file to which a time stamp has yet to be added, the file management apparatus 2 moves to Step S1601.

Before performing S607 of FIG. 16, the file management apparatus may integrate the extracted files after sorting them by the order of the files' registration date or the order of the file name.

FIG. 18 shows the extracted files displayed in a list format; however, the present invention is not limited to this format. The files may be displayed in a thumbnail or an icon format. As a means of selecting files, check boxes are used; however, the present invention is not limited to this style.

In the above embodiments, a file to which a time stamp is to be added stores therein an image data piece; however, a document file may be a target for the time stamp addition. In this case, the file management apparatus extracts a character code corresponding to a predetermined character string, whereby being able to judge whether to make the file a target for the time stamp addition.

In the above embodiments, the file integration is realized in a manner that an image data piece is read from each of the multiple files, and the obtained pieces of plain image data are arranged vertically, as shown in FIG. 2. However, in the case of dealing with text files or such, integration of stored data may be realized with unnecessary end codes being deleted.

In the above embodiments, a menu screen is displayed and then the implementation of the time stamp addition is performed when it is selected by the user. However, the time stamp addition may be performed at the system startup or end, or at the detection of the arrival of the predetermined time.

In the above embodiments, the attribute information includes a reservation date flag; however, it may include a reservation date and time flag, instead of the reservation date flag. In this case, when the reservation date and time flag is ON, reservation date and time will be set by the user.

Here, the term "files" may be also called, for example, documents or electric files, and is a collective term indicating a wide range of data used on a computer including not only textual information but also data created by computerizing various information such as moving images, static images and sounds, as well as data created on a computer such as computer programs.

Accordingly, the file management apparatus of the present invention allows for integrating data stored in multiple files and collectively obtaining a time stamp for them, whereby reducing the number of times obtaining time stamps and therefore reducing the cost for obtaining time stamps. Furthermore, this process eliminates the necessity of a time stamp to be added to each file, whereby preventing a reduction in operating efficiency in file management.

Here, it is desirable that the time stamping part transmit the hash value to a trusted time stamp authority and obtain the time stamp therefrom. Here, the time stamp is generated by adding time information to the hash value.

Herewith, the reliability of a time stamp to be added can be assured.

Here, the file management apparatus may further comprise a setting part operable to set attribute information regarding addition of the time stamp. Here, the plurality of files are selected based on the attribute information.

Here, the attribute information may include a flag indicating whether the addition of the time stamp is necessary. Here, the plurality of files are selected based on setting of the flag and whether the time stamp has already been added to the file.

Herewith, a reservation for the time stamp addition can be made with a simple process of just setting the attribute information, and a time stamp can be added afterwards, which prevents the time stamp addition from being forgotten.

Here, the selecting part may extract a plurality of files (i) for which the flag indicates that the addition of the time stamp is necessary and (ii) on which the addition of the time stamp has yet to be performed, and select files including a predetermined character string from among the extracted files.

Herewith, time stamps can be added to a collection of files that includes a specific word, such as "receipt", which enabling efficient file management.

Here, the selecting part may extract a plurality of files (i) for which the flag indicates that the addition of the time stamp is necessary and (ii) on which the addition of the time stamp has yet to be performed, and select, from among the extracted files, files including a character string indicating a date and time in a predetermined area.

Herewith, it is possible to prevent a time stamp from being added to an invalid file, such as a receipt having no date, or no date and time, written in the entry space thereon.

Here, the selecting part may exclude, from selection targets, a file including the character string indicating the date and time which has yet to arrive.

Herewith, it is possible to prevent a time stamp from being added to a file on which an invalid date, or an invalid date and time, is written.

Here, the setting part may receive details of the attribute information for each folder, and set the received attribute information to files registered in the folder.

This improves operating efficiency in registering files to the file management apparatus. Especially, in the case of successionally registering multiple files, there is no need to perform operations for obtaining a time stamp for each of the files. Furthermore, this also eliminates mistakes of forgetting time stamp addition when the user has an intention of collectively obtaining time stamps at the same time after all files are registered.

The present invention may be a method of accomplishing the above described file management apparatus, or may be a computer program that achieves the method by a computer.

The present invention may have a structure created by combining two or more of the above embodiments and configurations described in the supplementary remarks.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be constructed as being included therein.

What is claimed is:

1. A file management apparatus for managing registered files, comprising:

a memory;

a selecting part which selects a plurality of electronically-stored files from the registered files;

an integrating part which integrates data stored in the selected electronically-stored files and store the integrated data as a single file in the memory of the file management apparatus;

a time stamping part which calculates a hash value of the single file, obtain a time stamp generated by coupling the hash value of the single file with time information, and add the time stamp to the single file; and a setting part which sets attribute information regarding addition of the time stamp;

wherein the plurality of files are selected based on the attribute information;

wherein the attribute information includes a flag indicating whether the addition of the time stamp is necessary;

wherein the plurality of files are selected based on setting of the flag and whether the time stamp has already been added to the file, wherein the selecting part extracts a plurality of files (i) for which the flag indicates that the addition of the time stamp is necessary and (ii) on which the addition of the time stamp has yet to be performed, and selects, from among the extracted files, files including a character string indicating a date and time in a predetermined area; and wherein the selecting part excludes, from selection targets, a file including the character string indicating the date and time which has yet to arrive.

2. The file management apparatus of claim 1, wherein the time stamping part transmits the hash value to a trusted time stamp authority and obtains the time stamp therefrom, the time stamp being generated by adding time information to the hash value.

3. The file management apparatus of claim 1, wherein the attribute information further includes adding time information indicating a date, or a date and time, for the addition of the time stamp, and the selected plurality of files are files (i) for which the flag indicates that the addition of the time stamp is necessary, (ii) on which the addition of the time stamp has yet to be performed, and (iii) for which the date, or the date and time, of the adding time information has arrived.

4. The file management apparatus of claim 1, wherein the attribute information further includes time limit information indicating a time limit period for the addition of the time stamp, and the selecting part selects, within the time limit period, the plurality of files (i) for which the flag indicates that the addition of the time stamp is necessary and (ii) on which the addition of the time stamp has yet to be performed.

5. The file management apparatus of claim 1, wherein the selecting part extracts a plurality of files (i) for which the flag indicates that the addition of the time stamp is necessary and (ii) on which the addition of the time stamp has yet to be performed, presents a list of the extracted files to a user, and receives a selection in the list from the user.

6. The file management apparatus of claim 1, wherein the selecting part extracts a plurality of files (i) for which the flag indicates that the addition of the time stamp is necessary and (ii) on which the addition of the time stamp has yet to be performed, and selects files including a predetermined character string from among the extracted files.

7. The file management apparatus of claim 6, wherein the registered files include character information indicating a character by a character code, and the character code of the selected files corresponds to the predetermined character string.

8. The file management apparatus of claim 6, wherein the registered files include image data, and the image data of the selected files includes an image corresponding to the predetermined character string.

9. The file management apparatus of claim 1, wherein the setting part sets the attribute information for each of the registered files.

10. The file management apparatus of claim 1, wherein the setting part receives details of the attribute information for each folder, and sets the received attribute information to files registered in the folder.

11. The file management apparatus of claim 1, wherein the data stored in the selected files is integrated according to a predetermined number of files.

12. The file management apparatus of claim 1, wherein the data stored in the selected files is integrated by size of printing paper.

13. The file management apparatus of claim 1, wherein the integrating part performs integration after sorting the selected files.

14. The file management apparatus of claim 13, wherein the integrating part performs sorting based on a registration date and time of each of the selected files.

15. The file management apparatus of claim 13, wherein the integrating part performs sorting based on a file name of each of the selected files.

16. The file management apparatus of claim 1, wherein the time stamping part adds the time stamp when an instruction from a user is received.

17. The file management apparatus of claim 1, wherein the time stamping part adds the time stamp when a predetermined operation is carried out.

18. The file management apparatus of claim 17, wherein the predetermined operation is one of a system startup, a system end, and a detection of an arrival of a predetermined time.

19. A management method for managing files registered in a file management apparatus, comprising the steps of:

(a) selecting a plurality of electronically-stored files from the registered files;

(b) integrating data stored in the selected electronically-stored files and store the integrated data in a single file in a memory device;

(c) calculating a hash value of the single file, obtaining a time stamp generated by coupling the hash value of the single file with time information, and adding the time stamp to the single file; and (d) setting attribute information regarding addition of the time stamp;

wherein the plurality of files are selected based on the attribute information;

wherein the attribute information includes a flag indicating whether the addition of the time stamp is necessary;

wherein the plurality of files are selected based on setting of the flag and whether the time stamp has already been added to the file, wherein the selecting part extracts a plurality of files (i) for which the flag indicates that the addition of the time stamp is necessary and (ii) on which the addition of the time stamp has yet to be performed, and selects, from among the extracted files, files including a character string indicating a date and time in a predetermined area; and wherein during the selecting step, a file including the character string indicating the date and time which has yet to arrive is excluded.

20. A computer readable storage medium recording thereon a computer-readable program that causes a computer to execute a process of managing files registered in a file management apparatus, wherein the program causes the computer to execute the steps of:

(a) selecting a plurality of electronically-stored files from the registered files;

(b) integrating data stored in the selected electronically-stored files and store the integrated data in a single file in a memory device;

(c) calculating a hash value of the single file, obtaining a time stamp generated by coupling the hash value of the single file with time information, and adding the time stamp to the single file; and (d) setting attribute information regarding addition of the time stamp;

wherein the plurality of files are selected based on the attribute information;

wherein the attribute information includes a flag indicating whether the addition of the time stamp is necessary;

wherein the plurality of files are selected based on setting of the flag and whether the time stamp has already been added to the file, wherein the selecting part extracts a plurality of files (i) for which the flag indicates that the addition of the time stamp is necessary and (ii) on which the addition of the time stamp has yet to be performed, and selects, from among the extracted files, files including a character string indicating a date and time in a predetermined area; and wherein during the selecting step, a file including the character string indicating the date and time which has yet to arrive is excluded.

21. A management method for managing electronically-stored files in a file management apparatus, the method comprising:

selecting a plurality of electronically-stored files from the file management apparatus;

integrating original data of the selected electronically-stored files by concatenating original data in each of the selected electronically-stored files and store the integrated data in a single file in a memory device; and calculating a hash value of the single file;

sending the hash value of the single file to a time stamp authority;

obtaining, from the time stamp authority, a time stamp generated by coupling the hash value of the single file with time information;

adding the time stamp to the single file; and setting attribute information regarding addition of the time stamp;

wherein the plurality of files are selected based on the attribute information;

wherein the attribute information includes a flag indicating whether the addition of the time stamp is necessary;

wherein the plurality of files are selected based on setting of the flag and whether the time stamp has already been added to the file, wherein the selecting part extracts a plurality of files (i) for which the flag indicates that the addition of the time stamp is necessary and (ii) on which the addition of the time stamp has yet to be performed, and selects, from among the extracted files, files including a character string indicating a date and time in a predetermined area; and wherein during the selecting step, a file including the character string indicating the date and time which has yet to arrive is excluded.

* * * * *